(12) United States Patent
Ishii et al.

(10) Patent No.: US 10,572,512 B2
(45) Date of Patent: *Feb. 25, 2020

(54) DETECTION METHOD AND INFORMATION PROCESSING DEVICE

(71) Applicant: FUJITSU LIMITED, Kawasaki-shi, Kanagawa (JP)

(72) Inventors: Hiroaki Ishii, Toyama (JP); Shinichi Omura, Kanazawa (JP); Shoshin Oiwa, Yokohama (JP); Michiaki Sumiya, Kaga (JP); Jiro Ikegami, Toyama (JP); Rie Takeuchi, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 461 days.

This patent is subject to a terminal disclaimer.

(21) Appl. No.: 15/278,761

(22) Filed: Sep. 28, 2016

(65) Prior Publication Data

US 2017/0097980 A1   Apr. 6, 2017

(30) Foreign Application Priority Data

Oct. 1, 2015   (JP) ................................. 2015-195976

(51) Int. Cl.
*G06F 17/30* (2006.01)
*G06F 16/28* (2019.01)
*G06N 20/00* (2019.01)

(52) U.S. Cl.
CPC ........... *G06F 16/285* (2019.01); *G06N 20/00* (2019.01)

(58) Field of Classification Search
CPC ............................................... G06F 17/30598
See application file for complete search history.

(56) References Cited

U.S. PATENT DOCUMENTS 6,735,550 B1 * 5/2004 Weekley ............. G06K 9/6217
702/182
2010/0050025 A1 * 2/2010 Grichnik ............... G05B 17/02
714/47.2

(Continued)

FOREIGN PATENT DOCUMENTS

JP   2010-191556 A   9/2010
JP   2013-229064 A   11/2013

(Continued)

OTHER PUBLICATIONS

Office Action, dated Mar. 19, 2019, issued in counterpart Japanese Patent Application No. 2015-195976 (w/ English machine translation; 9 pages).

(Continued)

*Primary Examiner* — Alex Gofman
(74) *Attorney, Agent, or Firm* — Westerman, Hattori, Daniels & Adrian, LLP

(57) ABSTRACT

A method includes generating a plurality of correlation information based on correlations between changes in each item in each of different pairs of items in a plurality of items per unit period of time in a time series, calculating a similarity between one piece of correlation information and another piece of correlation information, clustering the plurality of pieces of correlation information in identifying at least one normal state of a computer system, wherein the plurality of pieces of correlation information are clustered into one or more clusters, each representing a state of the computer system, based on the calculated similarities, and displaying the one or more clusters including an indication of an anomaly in the state of the computer system when a piece of correlation information is not clustered with at least one cluster identified as normal state of the computer system.

17 Claims, 16 Drawing Sheets

(56) References Cited

U.S. PATENT DOCUMENTS

| | | | |
|---|---|---|---|
| 2011/0246837 A1 | 10/2011 | Kato | |
| 2012/0041575 A1* | 2/2012 | Maeda | G05B 23/024 |
| | | | 700/80 |
| 2013/0198380 A1* | 8/2013 | Oono | G06F 11/3452 |
| | | | 709/224 |
| 2013/0274899 A1 | 10/2013 | Hamzaoui et al. | |
| 2013/0318011 A1 | 11/2013 | Jones et al. | |
| 2014/0142727 A1 | 5/2014 | Giering et al. | |
| 2014/0343966 A1* | 11/2014 | Miyoshi | G06Q 40/08 |
| | | | 705/3 |

FOREIGN PATENT DOCUMENTS

| | | |
|---|---|---|
| JP | 2013-246818 A | 12/2013 |
| JP | 2014-234113 A | 12/2014 |
| JP | 2014-238852 A | 12/2014 |
| WO | 2012/067031 A1 | 5/2012 |
| WO | 2012/090718 A1 | 7/2012 |

OTHER PUBLICATIONS

Office Action, dated Mar. 19, 2019, issued in Japanese Patent Application No. 2015-197554, which is counterpart to U.S. Appl. No. 15/284,128 (w/ English machine translation; 13 pages).

Midori Sugaya et al, "Suggest of Online Proactive Failure Prediction System for Embedded Systems", IPSJ SIG Technical Reports, Information Processing Society of Japan, pp. 1-8, Apr. 16, 2010 (w/ English Abstract; cited in Office Action issued in Japanese Patent Application No. 2015-197554).

* cited by examiner

| TIME | CLUSTER ID | | | |
|---|---|---|---|---|
| | 1 | 2 | ... | M |
| $T_1$ | $P_{1,1}$ | $P_{1,2}$ | | $P_{1,M}$ |
| $T_2$ | $P_{2,1}$ | $P_{2,2}$ | | $P_{2,M}$ |
| ⋮ | | | | |
| $T_k$ | $P_{k,1}$ | $P_{k,2}$ | | $P_{k,M}$ |

151b

| | | TRANSITION SOURCE CLUSTER ID | | | |
|---|---|---|---|---|---|
| | | 1 | 2 | ... | M |
| TRANSITION DESTINATION CLUSTER ID | 1 | $D_{1,1}$ | $D_{1,2}$ | | $D_{1,M}$ |
| | 2 | $D_{2,1}$ | $D_{2,2}$ | | $D_{2,M}$ |
| | ⋮ | | | | |
| | M | $D_{M,1}$ | $D_{M,2}$ | | $D_{M,M}$ |

151c

| CLUSTER ID | SDR | | |
|---|---|---|---|
| 1 | DATE AND TIME : yy:dd:ss, SDR=(1,0,⋯) | DATE AND TIME : yy:dd:ss, SDR=(1,0,⋯) | ... |
| 2 | DATE AND TIME : yy:dd:ss, SDR=(0,1,⋯) | DATE AND TIME : yy:dd:ss, SDR=(0,1,⋯) | ... |
| ⋮ | ⋮ | ⋮ | ⋮ |
| M | DATE AND TIME : yy:dd:ss, SDR=(1,1,⋯) | DATE AND TIME : yy:dd:ss, SDR=(1,1,⋯) | ... |

DETECTION METHOD AND INFORMATION PROCESSING DEVICE

CROSS-REFERENCE TO RELATED APPLICATION

This application is based upon and claims the benefit of priority of the prior Japanese Patent Application No. 2015-195976, filed on Oct. 1, 2015, the entire contents of which are incorporated herein by reference.

FIELD

The embodiments discussed herein are related to a clustering program, a clustering method, and an information processing device.

BACKGROUND

The current information and technology (IT) system (hereinafter, referred to simply as the system) includes a large number of devices such as servers, storage devices, and network devices. Furthermore, an observing device that observes the operating status of the system is also included in the system. The observing device obtains a huge amount of time-series data from the large number of devices included in the system in order to determine whether the system is normally operating. For example, the observing device obtains information relating to the statuses of use of a central processing unit (CPU) and a memory of each server and displays time change of the statuses of use on a monitor by a graph. However, when the amount of displayed items becomes very large, it becomes difficult for an operation administrator to visually check the items and recognize the occurrence of an abnormal state.

Therefore, there has been devised a method for efficiently determining the kind, occurrence place, and cause of an abnormality or assisting the determination in a complex system (for example, International Publication Pamphlet No. WO 2012/090718). Furthermore, there has also been devised a method for alleviating the work load in setting a condition for determining whether the current state is the state in which a predictor of a service level breach in a system appears (for example, International Publication Pamphlet No. WO 2012/067031). Moreover, there has also been devised a method for detecting an abnormality in multivariate time-series data acquired by a sensor of equipment for monitoring the equipment state (for example, Japanese Laid-open Patent Publication No. 2013-246818).

SUMMARY

According to an aspect of the embodiment, a non-transitory computer readable medium storing a computer-executable program causing a computer to execute a method includes generating a plurality of pieces of correlation information based on correlations between changes in each item in each of different pairs of items in a plurality of items per unit period of time in a time series, each item relating to at least one of an operation, a performance, or a load in a computer system, each of the plurality of pieces of correlation information being generated for the plurality of items in one unit period of time in the time series, calculating a similarity between one piece of correlation information for one unit period of time from the plurality of pieces of correlation information and another piece of correlation information for another unit period of time from the plurality of pieces of correlation information, for each pair of unit periods of time in the time series to produce calculated similarities, clustering the plurality of pieces of correlation information in identifying at least one normal state of the computer system, wherein the plurality of pieces of correlation information are clustered into one or more clusters, each representing a state of the computer system, based on the calculated similarities, and displaying the one or more clusters including an indication of an anomaly in the state of the computer system when a piece of correlation information is not clustered with at least one cluster identified as corresponding to the at least one normal state of the computer system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating one example of a learning result;

DESCRIPTION OF EMBODIMENTS

For example, an existing observing device monitors whether or not a measurement value surpasses a threshold for each single measurement item and determines that an abnormality exists if the measurement value surpasses the threshold. However, among the abnormal states of the system, there are abnormalities in which the measurement value surpasses the threshold in none of the measurement items (silent anomaly). Such abnormalities are difficult to detect through item-by-item monitoring. Therefore, it is difficult to correctly detect the abnormal state of the system in some cases.

In one aspect, techniques disclosed in the embodiments discussed herein intend to improve the detection accuracy of the abnormal state of a system.

The embodiments will be described below with reference to the drawings. Each embodiment can be carried out by combining plural embodiments within a consistent range.

[First Embodiment]

First, a first embodiment will be described. In the first embodiment, an information processing device generates correlation information indicating the state of a system in each unit period on the basis of the correlation of time change of a value among plural items of the system. Then, the information processing device carries out clustering of the plural pieces of correlation information. At this time, the "state of the system" can be identified with the "cluster" and the state change of the system can be properly monitored due to which cluster the generated correlation information belongs to.

Figure 1:
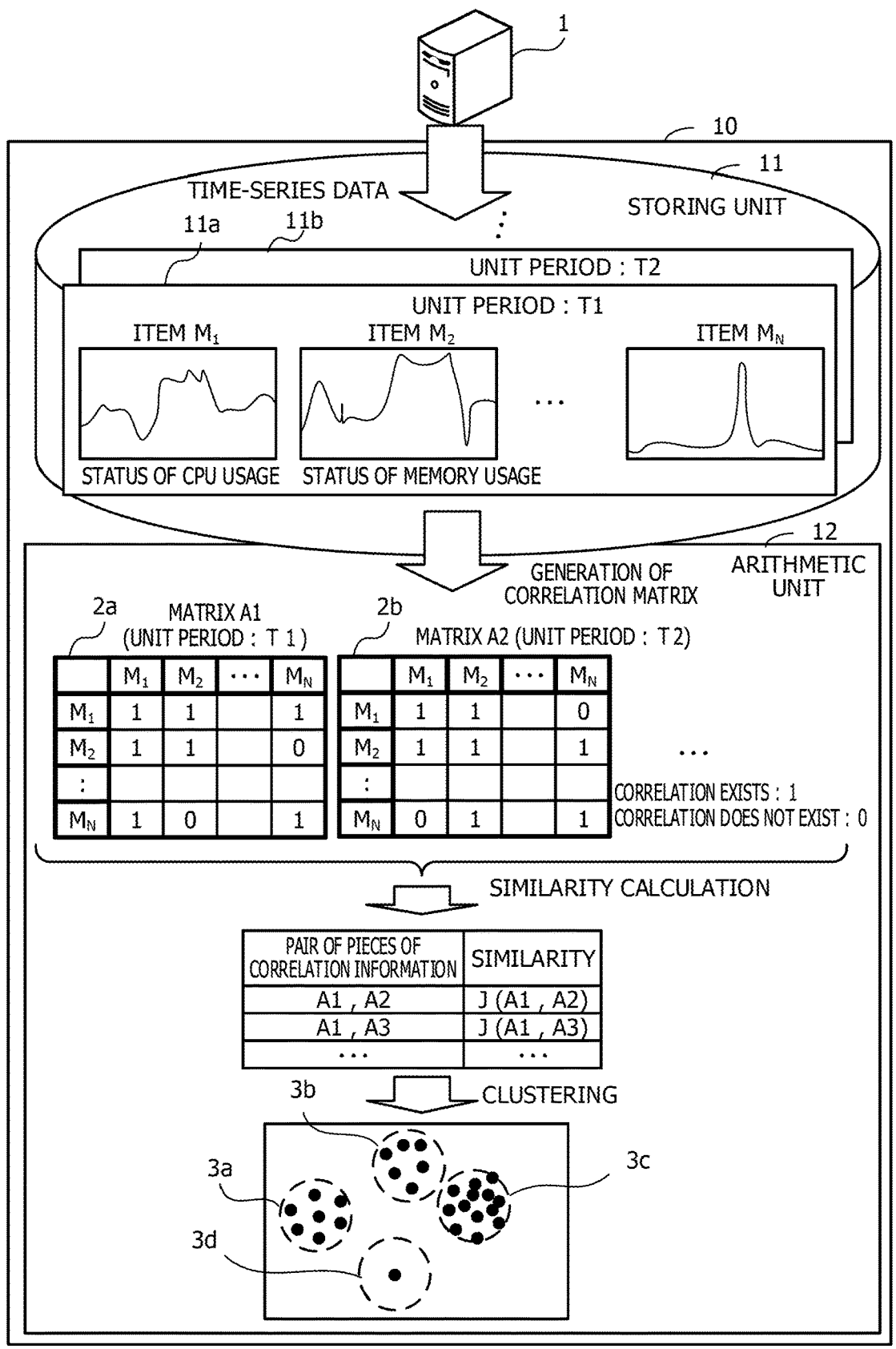
FIG. 1 is a diagram illustrating a configuration example of an information processing device according to a first embodiment.

FIG. 1 is a diagram illustrating a configuration example of the information processing device according to the first embodiment. An information processing device 10 is coupled to a system 1 as a management target via a network for example. The system 1 is a computer system including plural servers and plural storage devices for example. The information processing device 10 monitors the operating status of the system 1 and detects the occurrence of an abnormal state that possibly becomes a predictor of failure. For this purpose, the information processing device 10 includes a storing unit 11 and an arithmetic unit 12.

The storing unit 11 stores pieces 11a, 11b, . . . of time-series data representing time change in every unit period regarding the values of plural items indicating the state of the system 1. For example, the information processing device 10 monitors the system 1 and acquires, from the system 1, the pieces 11a, 11b, . . . of time-series data of the values of the plural items indicating the state of the system 1 as the management target to store the pieces 11a, 11b, . . . of time-series data in the storing unit 11. The plural items indicating the state of the system 1 are items relating to the performance or load of the system 1, such as the status of use of a CPU and the status of use of a memory, for example.

On the basis of the pieces 11a, 11b, . . . of time-series data in the storing unit 11, the arithmetic unit 12 generates pieces 2a, 2b, . . . of correlation information indicating the correlation of time change of the value among the plural items regarding a respective one of plural unit periods. For example, the arithmetic unit 12 generates an item pair obtained by selecting two items from the plural items regarding all combinations. The arithmetic unit 12 calculates a correlation coefficient of the time change of the value in the unit period for each item pair. Next, when the absolute value of the correlation coefficient of the item pair is equal to or larger than a threshold, the arithmetic unit 12 determines that a correlation exists, and sets the value indicating the correlation between the items of the item pair to "1." Furthermore, when the absolute value of the correlation coefficient of the item pair is smaller than the threshold, the arithmetic unit 12 determines that a correlation does not exist, and sets the value indicating the correlation between the items of the item pair to "0." Then, the arithmetic unit 12 generates matrices whose elements are the values each indicating the correlation of a respective one of the plural item pairs as the pieces 2a, 2b, . . . of correlation information.

Next, the arithmetic unit 12 calculates the similarities among the plural pieces 2a, 2b, . . . of correlation information of the plural unit periods. For example, the arithmetic unit 12 counts the number of elements about which the logical sum of corresponding elements in the matrices of two pieces of correlation information as the similarity calculation target is "1" and the number of elements about which the logical product of corresponding elements in these two matrices is "1." Then, the arithmetic unit 12 calculates the similarity between the two pieces of correlation information as the similarity calculation target according to the ratio of the number of elements about which the logical sum is "1" and the number of elements about which the logical product is "1." The arithmetic unit 12 executes such similarity calculation processing for each pair of pieces of correlation information obtained by selecting two pieces of correlation information from the plural pieces 2a, 2b, . . . of correlation information.

Then, the arithmetic unit 12 carries out clustering of plural pieces of correlation information on the basis of the calculated similarities. For example, the arithmetic unit 12 causes pieces of correlation information whose similarity is equal to or higher than a given threshold to belong to the same cluster. In this case, the arithmetic unit 12 carries out the clustering in such a manner that correlation information belonging to a certain cluster has similarities equal to or higher than the threshold with all other pieces of correlation information belonging to this cluster.

By clustering the pieces of correlation information in this manner, plural clusters 3a, 3b, 3c, and 3d are generated. In the example of FIG. 1, dots in the clusters 3a, 3b, 3c, and 3d indicate correlation information belonging to the cluster. As illustrated in FIG. 1, the existence of the cluster 3d, to which only one piece of correlation information belongs, is also permitted.

Referring to the generated clusters 3a, 3b, 3c, and 3d allows discrimination between the time zone in which the state of the system 1 is normal and the time zone in which the state of the system 1 is a state different from the normal state. For example, the correlation information belonging to the cluster 3d is similar to none of the other pieces of correlation information. There is a possibility that the system 1 was in the abnormal state in the unit period corresponding to the time-series data as the generation source of such correlation information. For example, the arithmetic unit 12 displays the unit period corresponding to the correlation information belonging to the cluster 3d on a monitor or the like. This allows the administrator to recognize the time zone in which the system 1 became the abnormal state.

In addition, the correlation information is generated by using the correlations among the plural items. Therefore, even when an abnormality is not recognized through item-by-item observation, the abnormality of the state of the system 1 is often reflected in the correlation information. That is to say, if a correlation breaks to disappear in a certain time period regarding two items having the correlation in the normal state of the system 1, there is a possibility that any abnormality is caused in this unit period. Such a change relating to the presence or absence of the correlation is reflected in the correlation information. If an abnormality occurs in the system 1 and the presence or absence of the correlation changes regarding a large number of item pairs, generated correlation information differs from correlation information generated in the normal state.

The correlation information representing such an abnormal state belongs to a cluster to which only this correlation information belongs or belongs to a cluster in which the generation probability of the correlation information belonging to this cluster is very low. Therefore, the information processing device 10 displays, on the monitor, the fact that correlation information indicating the state of the system 1 in a certain unit period came to belong to a cluster in which the generation probability of the correlation information belonging to this cluster is very low for example. This allows the administrator to easily recognize the occurrence of an abnormality of the system 1 difficult to recognize through item-by-item observation. As above, in the first embodiment, an abnormality of the system 1 difficult to recognize through item-by-item observation can be detected and the detection accuracy of the abnormality of the state of the system 1 is improved.

Furthermore, every time new time-series data is input to the storing unit 11, the information processing device 10 can also dynamically decide the cluster to which the correlation information representing the state of the system 1 at this time is to belong. For example, the arithmetic unit 12 calculates a representative sum and a representative product about each of the plural clusters generated by clustering. The representative sum is obtained by taking the logical sum among corresponding elements in the matrices of plural pieces of correlation information belonging to the cluster. The representative product is obtained by taking the logical product among corresponding elements in the matrices of plural pieces of correlation information belonging to the cluster. Next, the arithmetic unit 12 generates new correlation information indicating correlations among plural items on the basis of time change of values corresponding to the plural items in a new unit period. Then, the arithmetic unit 12 detects the cluster whose representative sum and representative product do not change even when the new correlation information is added to this cluster among the plural clusters, and causes the new correlation information to belong to the detected cluster.

In this manner, every time the time-series data of a new unit period is acquired from the system 1, which cluster indicates the state corresponding to the latest state of the system 1 can be determined.

There is also the case in which the cluster whose representative sum and representative product do not change even when the new correlation information is added to this cluster does not exist. In this case, for example, the arithmetic unit 12 detects the cluster whose similarity to the representative sum and the representative product obtained after the addition of the new correlation information is equal to or higher than a threshold, and causes the new correlation information to belong to the detected cluster.

If the cluster to which the new correlation information is caused to belong does not exist, the arithmetic unit 12 generates a new cluster and causes the new correlation information to belong to the new cluster. As above, if an appropriate cluster does not exist when the cluster to which new correlation information belongs is discriminated, a cluster to which only this correlation information belongs is newly generated. The newly-generated cluster represents a state different from the state of the system 1 thus far. Therefore, for example if the arithmetic unit 12 displays the generation of the new cluster on the monitor, the administrator can immediately understand that the current state of the system 1 is different from the normal state.

The arithmetic unit 12 can be implemented by a processor possessed by the information processing device 10 for example. Furthermore, the storing unit 11 can be implemented by a memory or a storage device possessed by the information processing device 10 for example.

[Second Embodiment]

Next, a second embodiment will be described.

Figure 2:
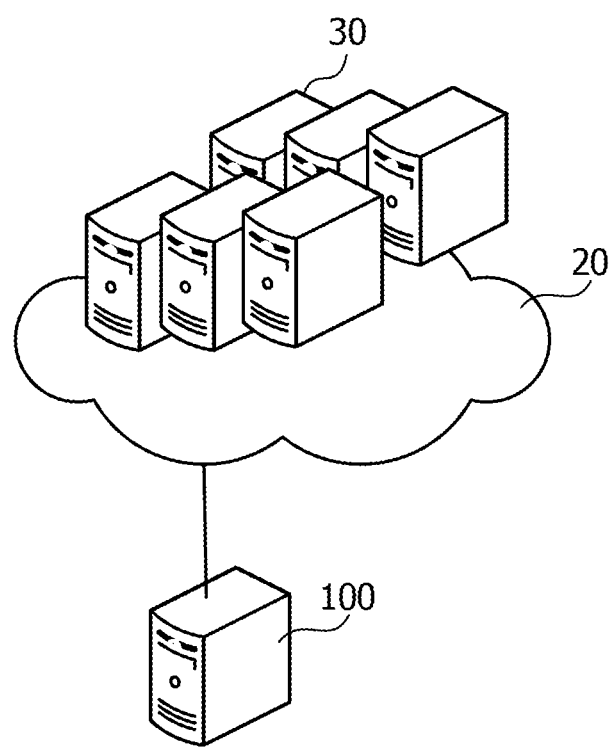
FIG. 2 is a diagram illustrating a system configuration example of a second embodiment.

FIG. 2 is a diagram illustrating a system configuration example of the second embodiment. A system 30 is coupled to an observing device 100 via a network 20. The system 30 is an ICT system including devices such as servers, storage devices, and network equipment. The observing device 100 acquires information indicating the operating status from the system 30 and monitors the operation of the system 30 on the basis of the acquired information.

Figure 3:
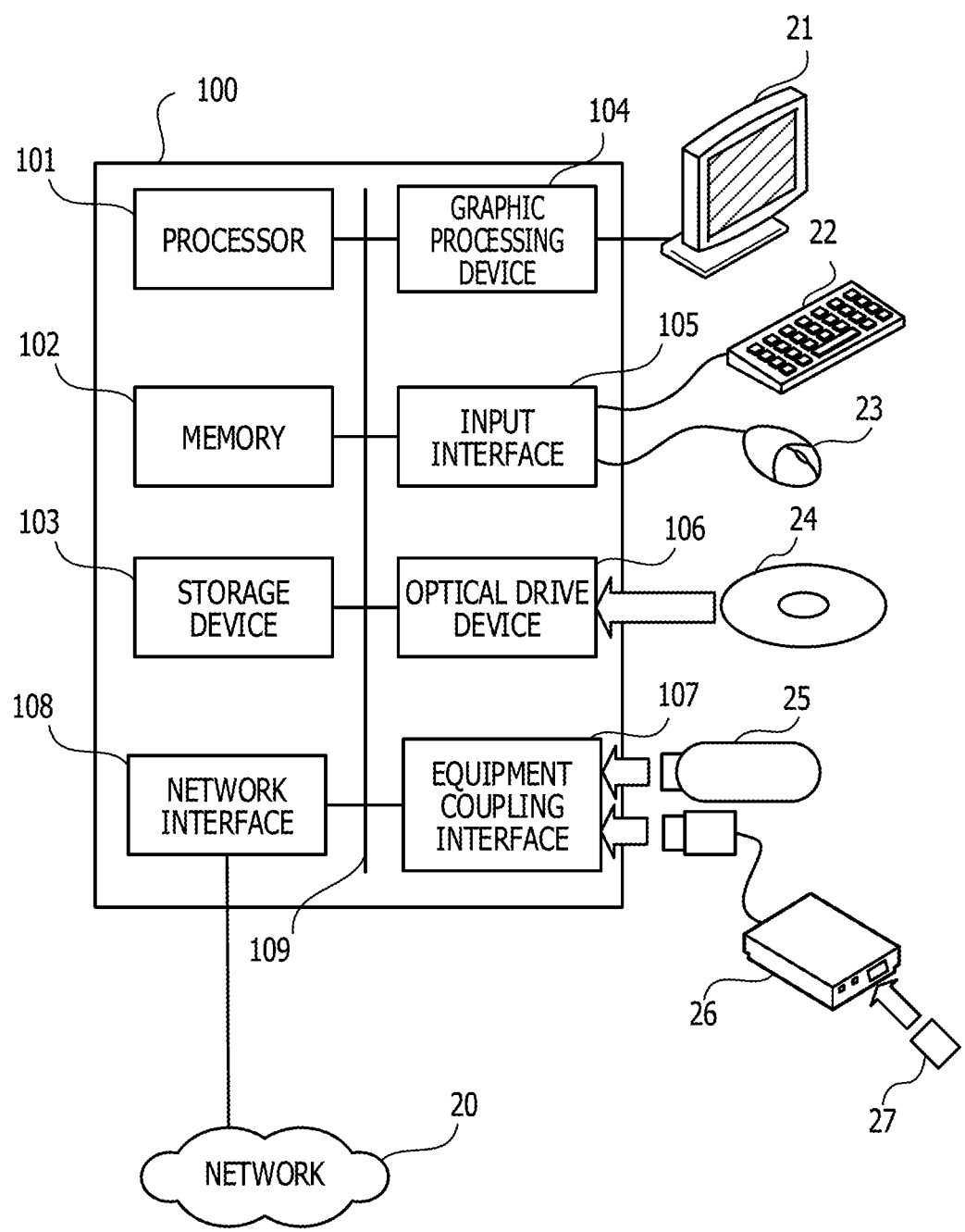
FIG. 3 is a diagram illustrating one configuration example of hardware of an observing device.

FIG. 3 is a diagram illustrating one configuration example of hardware of the observing device. The whole of the observing device 100 is controlled by a processor 101. To the processor 101, a memory 102 and plural pieces of peripheral equipment are coupled via a bus 109. The processor 101 may be a multiprocessor. The processor 101 is a CPU, a micro processing unit (MPU), or a digital signal processor (DSP) for example. At least part of functions implemented through execution of a program by the processor 101 may be implemented by an electronic circuit such as an application specific integrated circuit (ASIC) or a programmable logic device (PLD).

The memory 102 is used as a main memory device of the observing device 100. In the memory 102, at least part of a program of an operating system (OS) and application programs to be executed by the processor 101 is temporarily stored. Furthermore, various kinds of data for processing by the processor 101 are stored in the memory 102. As the memory 102, a volatile semiconductor memory device such as a random access memory (RAM) is used for example.

As the pieces of peripheral equipment coupled to the bus 109, there are a storage device 103, a graphic processing device 104, an input interface 105, an optical drive device 106, an equipment coupling interface 107, and a network interface 108.

The storage device 103 carries out data writing and reading electrically or magnetically with respect to a built-in storing medium. The storage device 103 is used as an auxiliary memory device of the computer. In the storage device 103, the program of the OS, the application programs, and various kinds of data are stored. As the storage device 103, a hard disk drive (HDD) or a solid state drive (SSD) can be used for example.

A monitor 21 is coupled to the graphic processing device 104. The graphic processing device 104 displays images on the screen of the monitor 21 in accordance with a command from the processor 101. As the monitor 21, a display device using a cathode ray tube (CRT), a liquid crystal display device, and so forth are available.

A keyboard 22 and a mouse 23 are coupled to the input interface 105. The input interface 105 transmits signals sent from the keyboard 22 and the mouse 23 to the processor 101. The mouse 23 is one example of a pointing device and it is also possible to use other pointing devices. As other pointing devices, a touch panel, a tablet, a touchpad, a trackball, and so forth are available.

The optical drive device 106 reads data recorded on an optical disc 24 by using laser light or the like. The optical disc 24 is a portable recording medium on which data is so recorded as to be allowed to be read by light reflection. As the optical disc 24, a digital versatile disc (DVD), a DVD-RAM, a compact disc read only memory (CD-ROM), a CD-R (Recordable)/RW (ReWritable), and so forth are available.

The equipment coupling interface 107 is a communication interface for coupling peripheral equipment to the observing device 100. For example, a memory device 25 and a memory reader/writer 26 can be coupled to the equipment coupling interface 107. The memory device 25 is a recording medium equipped with a function of communications with the equipment coupling interface 107. The memory reader/writer 26 is a device that carries out data writing to a memory card 27 or data reading from the memory card 27. The memory card 27 is a card-type recording medium.

The network interface 108 is coupled to the network 20. The network interface 108 carries out transmission and reception of data with another computer or communication equipment via the network 20.

By the above-described hardware configuration, the processing functions of the second embodiment can be implemented. The information processing device 10 illustrated in the first embodiment can also be implemented by hardware similar to that of the observing device 100 illustrated in FIG. 3.

The observing device 100 implements the processing functions of the second embodiment by executing a program recorded on a computer-readable recording medium for example. The program in which the contents of processing to be executed by the observing device 100 are described can be recorded on various recording media. For example, the program to be executed by the observing device 100 can be stored in the storage device 103. The processor 101 loads at least part of the program in the storage device 103 into the memory 102 and executes the program. Furthermore, it is also possible to record the program to be executed by the observing device 100 on a portable recording medium such as the optical disc 24, the memory device 25, or the memory card 27. The program stored in the portable recording medium is installed on the storage device 103 by control from the processor 101 for example and then becomes executable. Furthermore, it is also possible for the processor 101 to directly read out the program from the portable recording medium and execute the program.

By the observing device 100 with such hardware, the state of the system 30 is observed through the network 20.

Figure 4:
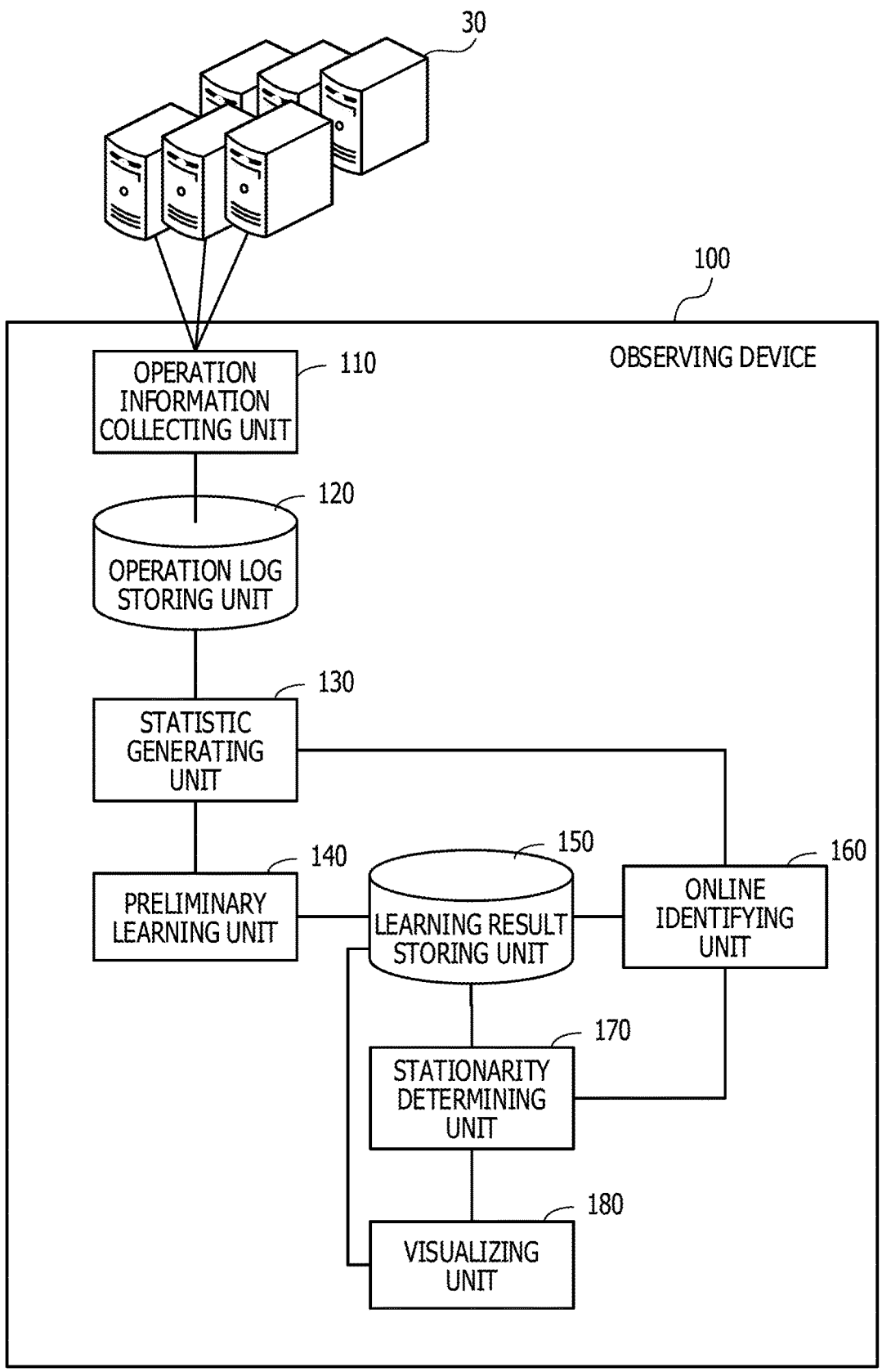
FIG. 4 is a block diagram illustrating functions of an observing device.

FIG. 4 is a block diagram illustrating functions of the observing device. The observing device 100 includes an operation information collecting unit 110, an operation log storing unit 120, a statistic generating unit 130, a preliminary learning unit 140, a learning result storing unit 150, an online identifying unit 160, a stationarity determining unit 170, and a visualizing unit 180.

The operation information collecting unit 110 collects pieces of operation information from the devices in the system 30. For example, the operation information collecting unit 110 transmits a command for information collection (command for requesting execution, such as sar command) to each device in the system 30. Along with this, the operation information is returned from each device. The operation information collecting unit 110 stores collected pieces of operation information in the operation log storing unit 120 as operation logs. As the collection method of the operation information by the operation information collecting unit 110, a "real-time system" and a "batch system" are conceivable. The "real-time system" is a system in which pieces of data are collected in real time from each device configuring the system 30. The "batch system" is a system in which pieces of past operation information accumulated in the storage device in the system 30 are collectively input from this storage device.

The operation log storing unit 120 stores the logs of the pieces of operation information collected from the devices in the system 30 (operation logs). For example, part of the storing area of the storage device 103 is used as the operation log storing unit 120.

The statistic generating unit 130 analyzes the operation log in the operation log storing unit 120 and generates a multi-dimensional statistic (SDR). The SDR is information representing the state of the system 30 due to the correlations between all item pairs that can be acquired from plural items relating to the operation of the system 30. The SDR is generated for each unit period.

The preliminary learning unit 140 learns the SDR representing the normal state of the system 30 on the basis of the generated time-series SDRs. For example, the preliminary learning unit 140 analyzes what state of the SDR the system 30 readily becomes. Furthermore, the preliminary learning unit 140 analyzes what state of the SDR the system 30 readily makes transition to in the next time zone when the system 30 is in a state of a specific SDR in a certain time zone. In the case of analyzing the SDR, the preliminary learning unit 140 generates clusters by clustering SDRs generated on each unit period basis for example. The clustering carried out by the preliminary learning unit 140 is static similarity clustering based on the similarity of accumulated SDRs.

The preliminary learning unit 140 deems states indicated by SDRs belonging to the same cluster as the same state. The preliminary learning unit 140 stores a learning result in the learning result storing unit 150. The preliminary learning unit 140 executes the processing when the observing device 100 is operating in a preliminary learning mode for example. The preliminary learning mode is a mode for learning the normal state of the system 30.

The learning result storing unit 150 stores the learning result by the preliminary learning. For example, part of the storing area of the memory 102 or the storage device 103 is used as the learning result storing unit 150.

The online identifying unit 160 identifies which cluster indicated by the learning result obtained by the preliminary learning the SDR based on an operation log of the system 30 collected in real time belongs to. It is also possible for the online identifying unit 160 to update the learning result in the learning result storing unit 150 on the basis of the SDR discriminated in real time. The online identifying unit 160 executes the processing when the observing device 100 is operating in an operation diagnostic mode for example. The operation diagnostic mode is a mode for making a diagnosis of whether or not the state of the system 30 is the normal state.

The stationarity determining unit 170 statistically analyzes the learning result and determines whether or not the stationarity in the state of the system 30 exists. For example, the stationarity determining unit 170 divides a learning period into plural periods and compares pieces of specific statistical information in a respective one of the segmented periods obtained by the dividing. If a significant difference is not detected, the stationarity determining unit 170 determines that the stationarity exists (change due to the difference in the period is not caused) regarding the statistical information.

The visualizing unit 180 displays the learning result and the determination result of the stationarity on the monitor 21 or the like. For example, the visualizing unit 180 displays generated clusters on the monitor 21. Furthermore, for example if an SDR belonging to a cluster in which the generation probability of the SDR belonging to this cluster is low is generated, the visualizing unit 180 displays that effect on the monitor 21.

Due to such functions, the observing device 100 can observe the operating status of the system 30 and display an abnormal state in such a manner that the administrator easily recognizes the abnormal state when the abnormal state occurs. For example, an SDR that does not belong to clusters generated in the preliminary learning mode is generated in the operation diagnostic mode in some cases. This SDR belongs to a newly-generated cluster. The generation of the SDR belonging to the new cluster indicates deviation of the system 30 from the normal state thus far and involves a possibility of an abnormal state. Therefore, the observing device 100 displays information indicating the generation of the new cluster on the monitor 21 for example. Visualizing the generation of the new cluster as above allows the administrator to easily recognize that there is a possibility that the system 30 has become an abnormal state.

Lines coupling the respective elements illustrated in FIG. 4 indicate part of communication paths and communication paths other than the communication paths illustrated in FIG. 4 can also be set. Furthermore, the functions of each element illustrated in FIG. 4 can be implemented by causing a computer to execute a program module corresponding to the element for example.

Next, the operation log that is collected from the system 30 and stored in the operation log storing unit 120 will be described.

Figure 5:
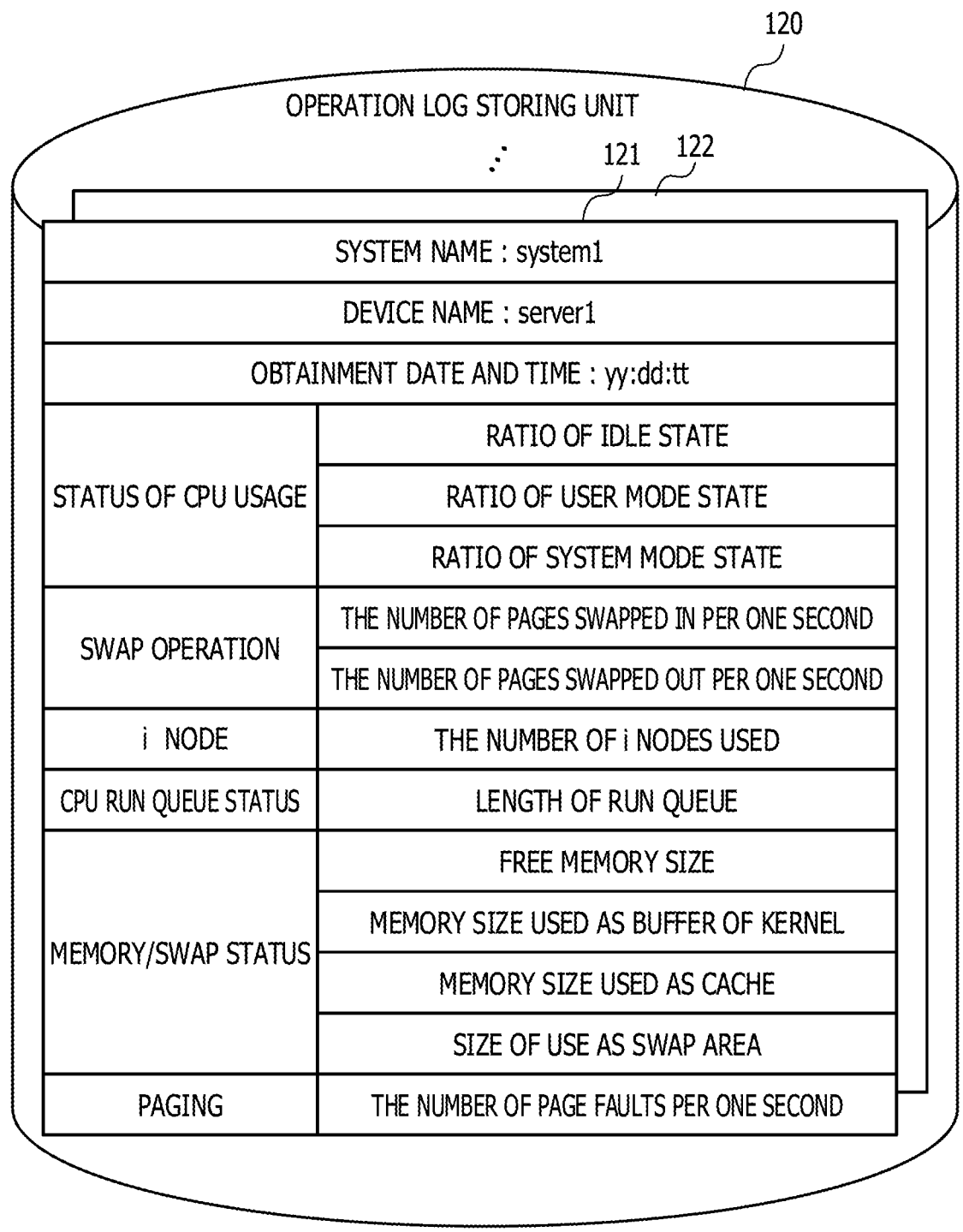
FIG. 5 is a diagram illustrating one example of an operation log stored in an operation log storing unit.

FIG. 5 is a diagram illustrating one example of the operation log stored in the operation log storing unit. Plural operation logs 121, 122, . . . are stored in the operation log storing unit 120.

For example, in the operation log 121, the system name of the system 30 to which the device that has outputted the operation log 121 belongs, the device name of the device, and the obtainment date and time of the operation log 121 are set. Moreover, in the operation log 121, information relating to performance items indicating the operating status in a unit period (for example, ten minutes) regarding the system 30 is included. As the performance items, there are items relating to the status of CPU usage, items relating to swap operation, items relating to the i node, items relating to the CPU run queue status, items relating to the memory/swap status, items relating to paging, and so forth. Each piece of information relating to the performance item is time transition of a numeric value relating to the performance item in the unit period for example.

As the performance items relating to the status of CPU usage, there are the ratio of the time for which the CPU was in the idle state due to waiting for the disk input/output (I/O), the ratio of the time for which the CPU was in the user mode state, the ratio of the time for which the CPU was in the system mode state, and so forth for example. As the performance items relating to swap operation, there are the number of pages swapped in per one second, the number of pages swapped out per one second, and so forth for example. As the performance items relating to the i node, there are the number of i nodes used and so forth for example. As the performance items relating to the CPU run queue status, there are the length of a waiting queue (the number of processes waiting for execution) and so forth for example. As the performance items relating to the memory/swap status, there are the free memory size, the memory size used as the buffer of the kernel, the memory size used as a cache, the size of a storing area used as the swap area of the memory, and so forth for example. As the performance items relating to paging, there are the number of times of page fault caused per one second and so forth.

When plural devices exist in the system 30, the operation information is acquired from each device. For example, if plural servers exist in the system 30, the operation information collecting unit 110 acquires, from each server, the operation information including performance items such as the ratio of the time for which the CPU was in the idle state due to waiting for the disk I/O.

The operating status of the system 30 is analyzed on the basis of such operation logs 121, 122, . . . . The analysis of the operating status by the observing device 100 is first carried out in the preliminary learning mode. Then, the operation diagnostic mode is carried out after generation of a learning result by the preliminary learning mode.

First, analysis processing of the operating status in the preliminary learning mode will be described.

Figure 6:
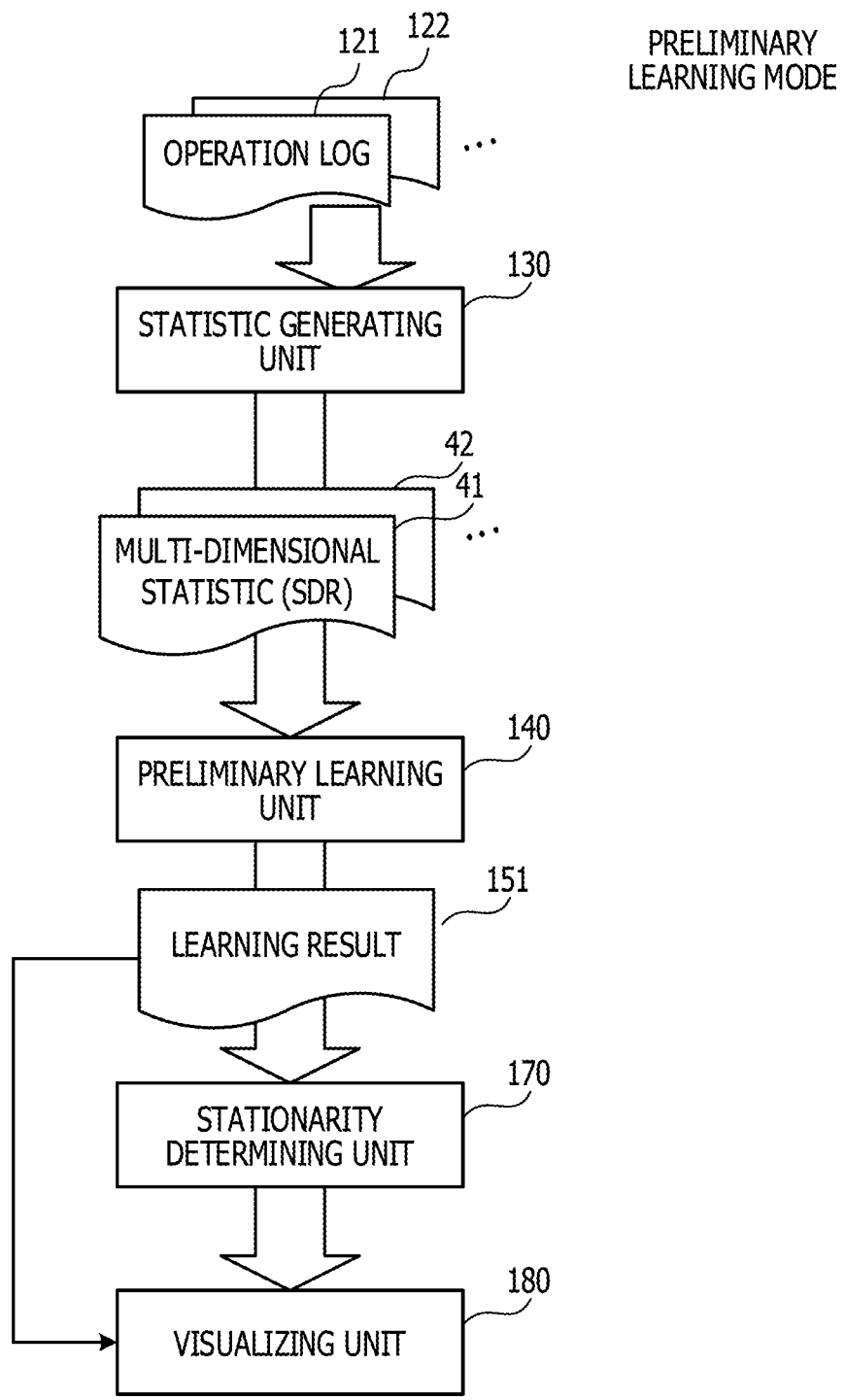
FIG. 6 is a diagram illustrating operating status analysis processing in a preliminary learning mode.

FIG. 6 is a diagram illustrating the operating status analysis processing in the preliminary learning mode. First, the statistic generating unit 130 executes statistic generation processing on the basis of the operation logs 121, 122, . . . and generates multi-dimensional statistics (SDR) 41, 42, . . . . One SDR is generated on the basis of the operation log in a specific unit period. If the number of performance items is N (N is an integer equal to or larger than 2), the SDR can be represented by a matrix of N rows and N columns (correlation matrix). Each element in the matrix represents whether or not the correlation between two performance items exists. It is also possible to line up the elements in the correlation matrix on one row and represent the SDR by a vector. The generated plural SDRs 41, 42, . . . each represent the operating status of the system 30 in the corresponding unit period.

On the basis of the generated plural SDRs 41, 42, . . . , preliminary learning relating to the tendency of generation of the operating status of the system 30 and the tendency of change in the operating status is carried out by the preliminary learning unit 140. Then, a learning result 151 is generated and stored in the learning result storing unit 150 by the preliminary learning unit 140. On the basis of the learning result 151, whether or not the stationarity exists is determined by the stationarity determining unit 170. Then, the learning result 151 and the result of the stationarity determination are visualized by the visualizing unit 180.

Each kind of processing represented in FIG. 6 will be described in detail below.

Figure 7:
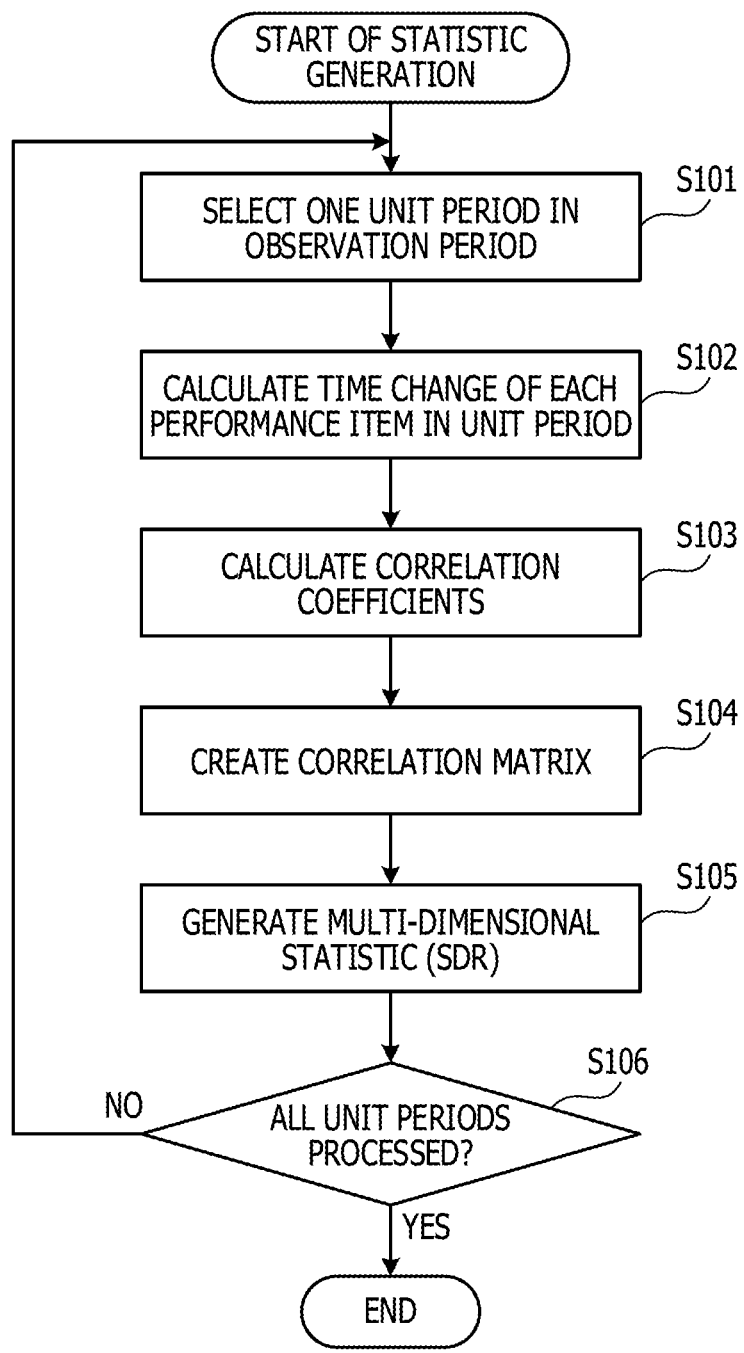
FIG. 7 is a flowchart illustrating one example of statistic generation processing.

FIG. 7 is a flowchart illustrating one example of statistic generation processing. The processing illustrated in FIG. 7 will be described below along the step numbers.

[Step S101] The statistic generating unit 130 selects one unit period that has not been processed among plural unit periods (for example, ten minutes) in an observation period (for example, a month).

[Step S102] The statistic generating unit 130 calculates time change of each performance item of the system 30 in the unit period on the basis of operation logs indicating the operation of the respective devices included in the system 30 in the unit period. For example, for each performance item, the statistic generating unit 130 takes the average at each time about numeric values (time-series data) indicated in the operation logs of the plural devices in the system 30 to calculate time change of the average.

[Step S103] The statistic generating unit 130 generates all of combinations obtained by selecting two performance items from the plural performance items and calculates a correlation coefficient for each combination of the performance items. If the number of performance items is N, the number of independent combinations of the performance items is "{N×(N−1)}/2." That is, "{N×(N−1)}/2" correlation coefficients are generated.

The correlation coefficient is a statistical index indicating the degree of the similarity between two variables. The correlation coefficient is a real numeric value from "−1" to "1." A more positive correlation exists when the correlation coefficient is closer to "1," and a more negative correlation exists when the correlation coefficient is closer to "−1." The correlation is weaker when the correlation coefficient is closer to "0." The statistic generating unit 130 obtains the absolute value of each correlation coefficient obtained regarding a respective one of the combinations of the performance items. Then, the statistic generating unit 130 sets a value indicating the correlation (correlation value) to "1" if the absolute value is equal to or larger than a threshold, and sets the correlation value to "0" if the absolute value is smaller than the threshold. That is, even for a negative correlation, the correlation value is "1" as long as a correlation exists. By replacing the correlation coefficient by the correlation value of "1" or "0" in this manner, the amount of calculation in subsequent processing such as clustering can be reduced.

[Step S104] The statistic generating unit 130 generates a correlation matrix by disposing the correlation values obtained for each pair of the performance items as the elements of the matrix. When the number of performance items is defined as N, the correlation matrix has N rows and N columns. Each of the plural performance items is associated with row and column of the correlation matrix. In each element of the correlation matrix, the correlation value between the performance item corresponding to the row of the element and the performance item corresponding to the column is set. The correlation matrix obtained is a symmetric matrix.

[Step S105] The statistic generating unit 130 generates an SDR from the correlation matrix. For example, the statistic generating unit 130 lines up the respective elements of the correlation matrix on one row to transform the correlation matrix to a multi-dimensional vector. Because "{N×(N−1)}/2" independent correlation values exist, a "{N×(N−1)}/2"-dimensional vector is obtained when the SDR is represented by the multi-dimensional vector. The multi-dimensional vector obtained by the transformation serves as the SDR.

[Step S106] The statistic generating unit 130 determines whether or not processing has been executed regarding all unit periods. If the processing regarding all unit periods has been completed, the statistic generation processing ends. If a unit period that has not been processed exists, the processing is advanced to the step S101.

In this manner, the SDR of each unit period in the observation period is obtained.

Figure 8:
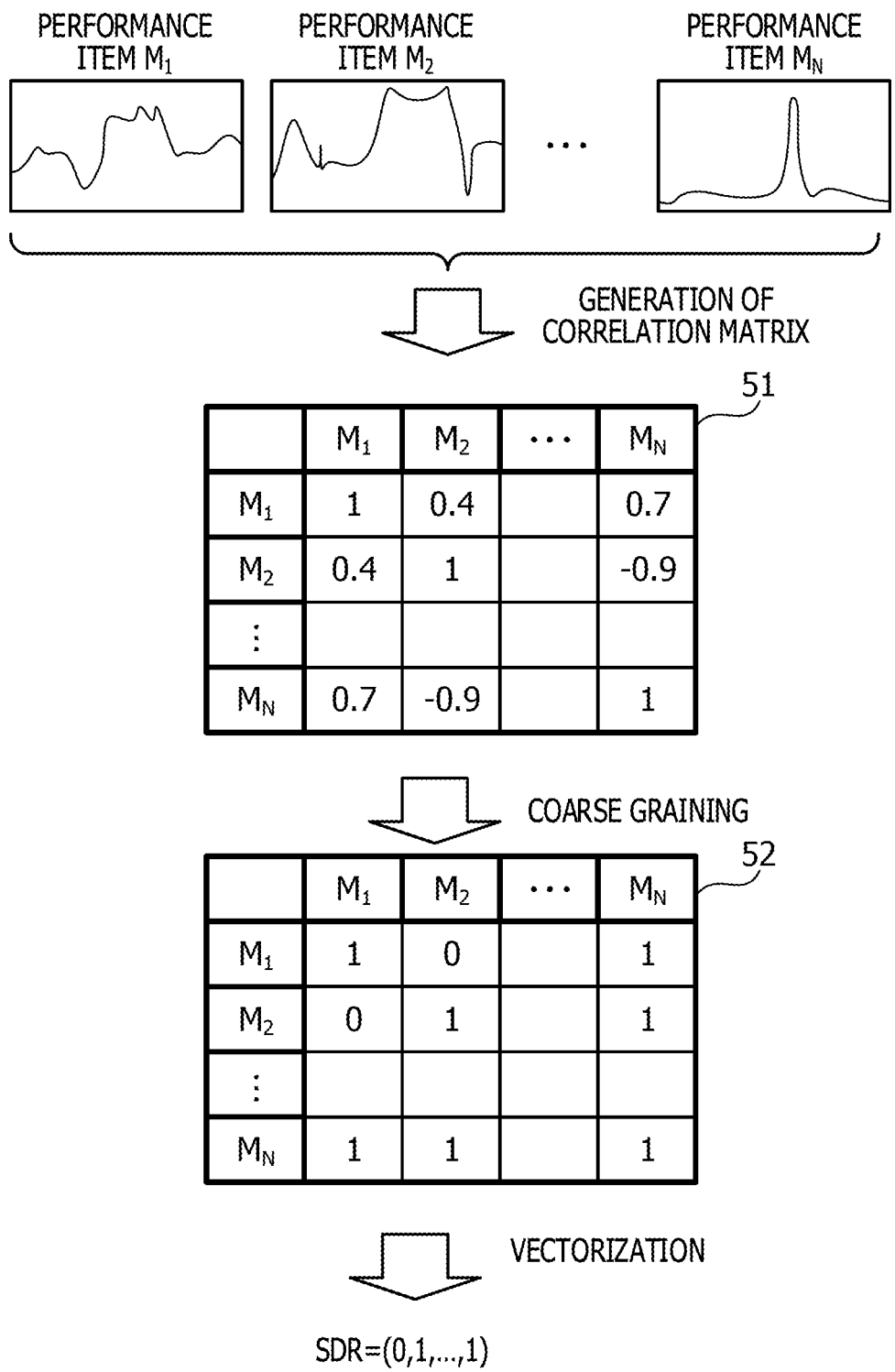
FIG. 8 is a diagram illustrating a generation example of a state description representations (SDR)

FIG. 8 is a diagram illustrating a generation example of an SDR.

When N performance items exist, a correlation coefficient of each combination of two performance items is calculated and a correlation matrix 51 is generated. For example, the correlation coefficient of a performance item $M_1$ and a performance item $M_2$ is set as the element of the first row and the second column and the element of the second row and the first column in the correlation matrix 51.

The correlation coefficient of each element of the correlation matrix 51 is subjected to coarse graining due to whether or not the absolute value is equal to or larger than a given threshold. As the threshold, a value adjusted to allow proper determination of whether or not a correlation exists is set. In the example of FIG. 8, the correlation value of "1" is set if the absolute value of the correlation coefficient is equal to or larger than "0.5" and the correlation value of "0" is set if the absolute value of the correlation coefficient is smaller than "0.5." Thereby, a correlation matrix 52 in which each element is digitized into "0" or "1" is generated.

Then, the respective elements in the correlation matrix 52 are lined up on one row and an SDR is generated. In the elements corresponding to the same combination of performance items, only one element is included in the SDR. For example, the statistic generating unit 130 lines up, on one row, the elements of the a-th row and the b-th column (a is an integer equal to or larger than 1 and b is an integer equal to or larger than a+1) in the correlation matrix 52 to generate the SDR.

Such an SDR is generated for each unit period in the observation period.

Next, the preliminary learning processing will be described in detail.

Figure 9:
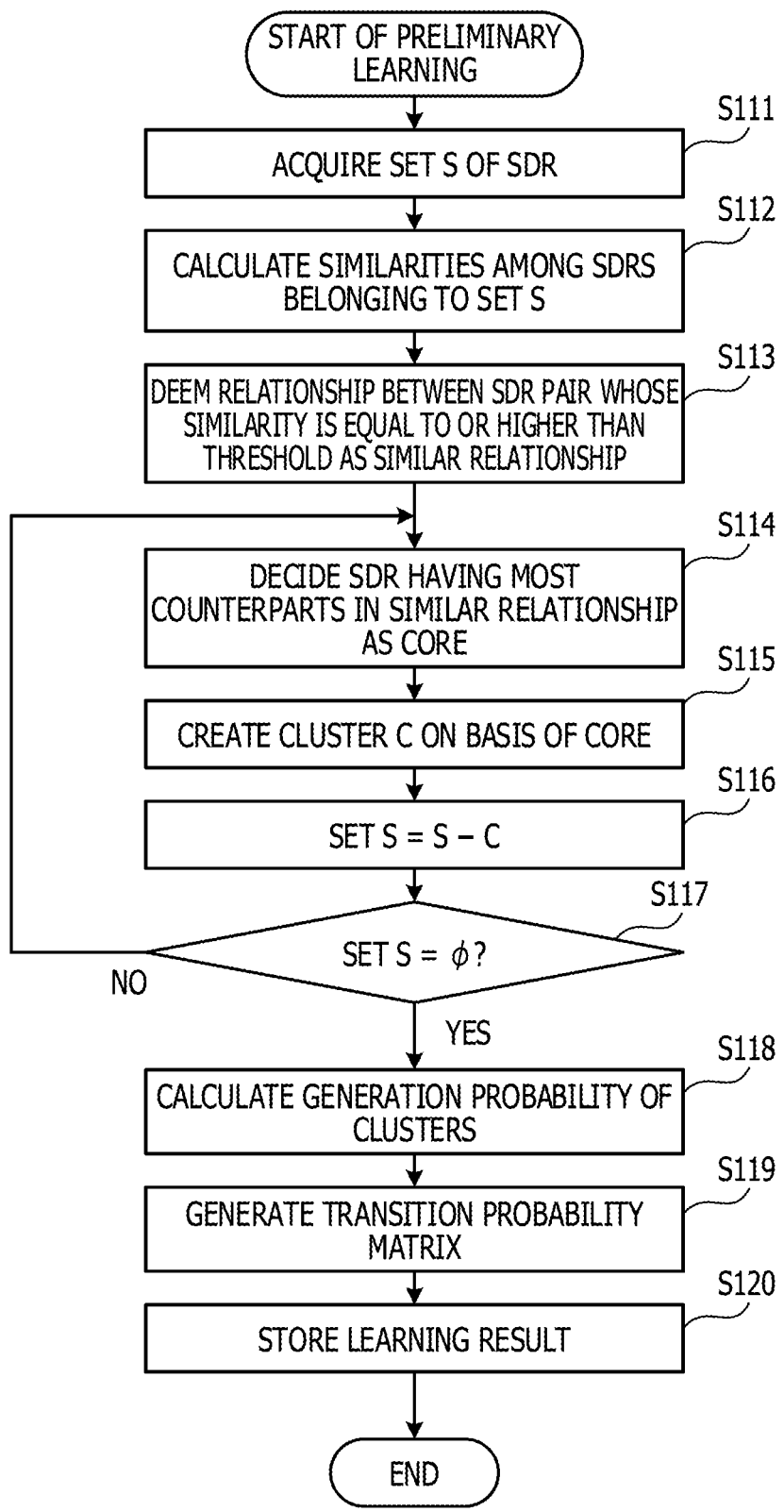
FIG. 9 is a flowchart illustrating one example of preliminary learning processing.

FIG. 9 is a flowchart illustrating one example of the preliminary learning processing. The processing illustrated in FIG. 9 will be described below along the step numbers.

[Step S111] When n (n is an integer equal to or larger than 1) SDRs exist, the preliminary learning unit 140 acquires a set S={$x_1$, $x_2$, . . . , $x_n$} of the SDR from the statistic generating unit 130.

The preliminary learning unit 140 carries out clustering of the SDR by processing of a step S112 and the subsequent steps. As the clustering method, a k-means method, a hierarchical clustering method, a spectrum clustering method, or the like can be used. In the second embodiment, a clustering method that allows generated clusters to properly represent the state of the system 30 is used. The clustering method applied to the second embodiment will be referred to as the "similarity clustering."

The procedure of the similarity clustering will be described below.

[Step S112] The preliminary learning unit 140 calculates the similarities among the SDRs belonging to the set S. As the similarity, the Jaccard index can be used for example. If the Jaccard index is employed as the similarity, with respect to any x, y∈S, the similarity J(x, y) is defined by the following expression.

$$J(x,y)=\text{Bit}(x \cap y)/\text{Bit}(x \cup y) \quad (1)$$

The Bit( ) function is a function of counting the number of bits of "1." "x∩y" is the element-by-element logical product of the vector of the SDR of x and the vector of the SDR of y. For example, when x=(1, 0, 0, 1) and y=(0, 1, 0, 1) are satisfied, "x∩y=(0, 0, 0, 1)" is obtained. "x∪y" is the element-by-element logical sum of the vector of the SDR of x and the vector of the SDR of y. For example, when x=(1, 0, 0, 1) and y=(0, 1, 0, 1) are satisfied, "x∪y=(1, 1, 0, 1)" is obtained. A larger value of the similarity indicates that the compared two SDRs (SDR pair) are more similar.

[Step S113] The preliminary learning unit 140 deems the relationship between the SDR pair whose similarity is equal to or higher than a given threshold th as the similar relationship. That is, the preliminary learning unit 140 determines that the similar relationship exists regarding the SDR pair satisfying the following expression.

$$x,y \in S, x \sim y \Leftrightarrow J(x,y) \geq th \quad (2)$$

[Step S114] The preliminary learning unit 140 decides the SDR having the most counterparts in the similar relationship as a core $S_{1*}$ among the SDRs belonging to the set S.

[Step S115] The preliminary learning unit 140 decides a cluster C on the basis of the core $S_{1*}$. For example, the preliminary learning unit 140 generates an ordered similar set Sim(S$_{1*}$) on the basis of the core S$_{1*}$. The similar set Sim(S$_{1*}$) is defined as follows.

$$\text{Sim}(S_{1*}) = \{\forall S_i \in S | J(S_{1*}, S_i) \geq th\} \tag{3}$$

The order of the elements in the similar set Sim(S$_{1*}$) is the decreasing order of the similarity. That is, the beginning of the elements of the similar set Sim(S$_{1*}$) is the core S$_{1*}$. If the number of elements included in the similar set Sim(S$_{1*}$) is m (m is an integer equal to or larger than 1), the similar set Sim(S$_1$*) can be represented as follows.

$$\text{Sim}(S_{1*}) = \{s_1 = S_{1*}, s_2, \ldots, s_m\} \tag{4}$$

The preliminary learning unit 140 generates the cluster C due to a set of SDRs having the similar relationship with each other among the SDRs included in the similar set Sim(S$_{1*}$). When the number of SDRs having the similar relationship with each other is k (k is an integer equal to or larger than 1), the cluster C is represented by the following expression.

$$C = \{s_1, s_2, \ldots, s_k\} \tag{5}$$

Here, when arbitrary two SDRs in the cluster C are defined as s$_i$ and s$_j$, the similarity J(s$_i$, s$_j$)≥th is satisfied.

In the second embodiment, the number of SDRs belonging to the generated cluster is permitted to be "1." That is, if another SDR in the similar relationship with the core S$_{1*}$ does not exist in the set S, a cluster including only the core S$_{1*}$ as the element is generated.

The preliminary learning unit 140 gives a cluster identification (ID) to the generated cluster C and stores the cluster C in the memory 102. For example, the preliminary learning unit 140 sets the cluster ID of the cluster C generated first to "1" and thereafter sets the cluster ID of the generated cluster to 2, 3, . . . every time the cluster is generated.

[Step S116] The preliminary learning unit 140 excludes the SDRs belonging to the cluster C created in the step S115 from the set S (set S=S−C).

[Step S117] The preliminary learning unit 140 determines whether or not the set S has become the empty set. If the set S is the empty set, the processing is advanced to a step S118. If at least one SDR is included in the set S, the processing is advanced to the step S114.

[Step S118] The preliminary learning unit 140 calculates the generation probability of the SDRs belonging to the generated respective clusters for each of time zones obtained by dividing the cycle as the basis (for example, one day (24 hours)) into plural periods. For example, suppose that K (K is an integer equal to or larger than 1) SDRs are generated on the basis of operation logs of one day. At this time, the obtainment times of the K operation logs of one day are defined as T$_1$, T$_2$, . . . T$_K$ in the increasing order of the time of the operation log.

The preliminary learning unit 140 makes a comparison among the SDRs corresponding to the time T$_1$ of the respective days in the observation period and calculates the generation probability of the clusters to which the respective SDRs belong. The preliminary learning unit 140 calculates the generation probability of the clusters regarding each of the times T$_2$, . . . T$_K$ similarly. This allows understanding of what cluster state the system 30 readily becomes in a specific time zone in one day.

[Step S119] The preliminary learning unit 140 generates a transition probability matrix among the clusters. The transition probability matrix is a matrix indicating the probability of transition of the SDR indicating the state of the system 30 from a certain cluster to another cluster.

For example, the preliminary learning unit 140 lines up the cluster IDs of the clusters to which SDRs belong in a time-series manner on the basis of the obtainment time of the operation logs as the generation sources of the SDRs. Next, the preliminary learning unit 140 extracts pairs of adjacent cluster IDs, and deems the former cluster ID in the time series as the transition source and deems the latter cluster ID in the time series as the transition destination. The preliminary learning unit 140 counts the numbers of times of generation of pairs of cluster IDs indicating the transition source and the transition destination. Then, the preliminary learning unit 140 deems the ratios of the numbers of times of generation of the pairs of cluster IDs that make transition from a transition source to the respective transition destinations to the total number of pairs of cluster IDs including this transition source in common as the transition probabilities from this transition source to the respective transition destinations. The preliminary learning unit 140 disposes the transition probabilities corresponding to the respective pairs of cluster IDs as the elements of a matrix to generate the transition probability matrix.

[Step S120] The preliminary learning unit 140 stores the learning result 151 in the learning result storing unit 150. In the learning result 151, information indicating the generation probability, the transition probability matrix, and information relating to the sets of SDRs belonging to the respective clusters are included.

In this manner, the generation probability and the transition probability matrix are generated.

Figure 10:
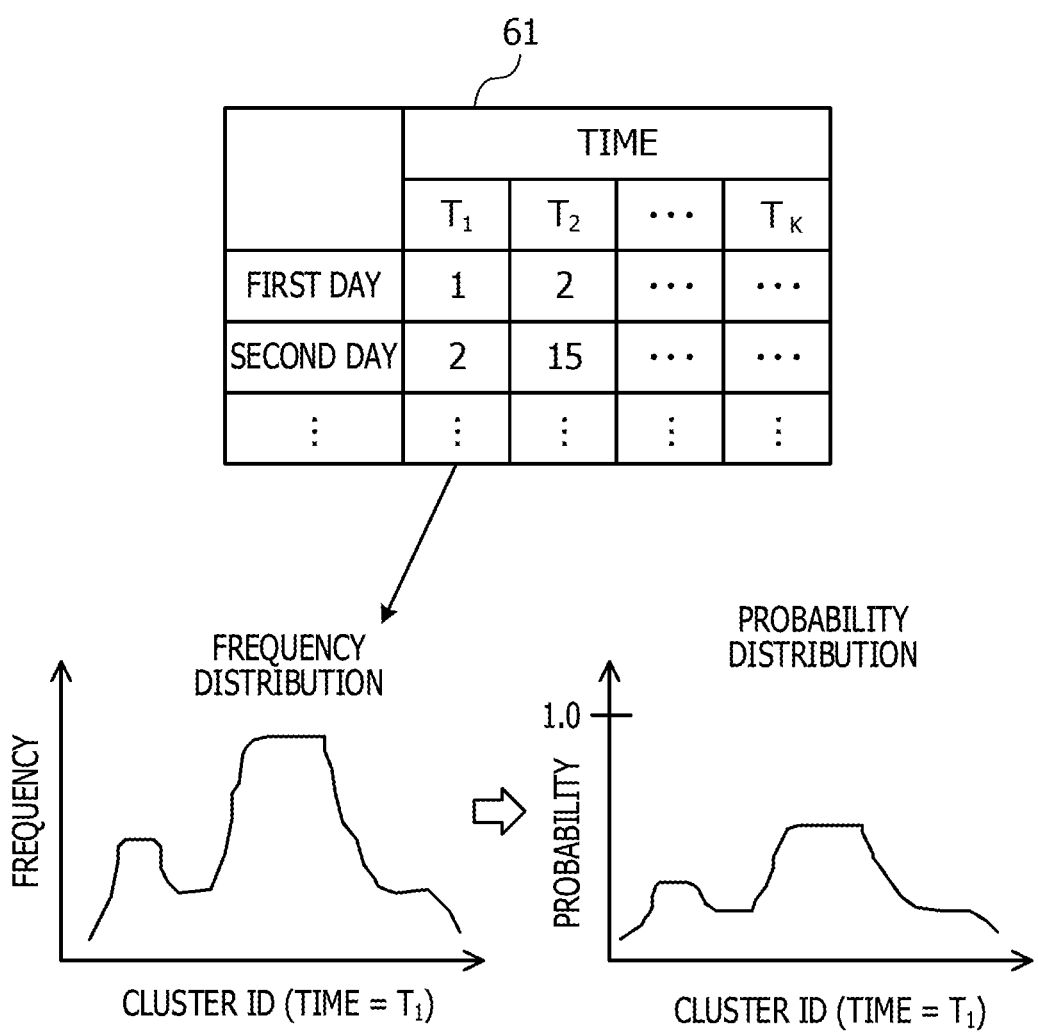
FIG. 10 is a diagram illustrating a calculation example of generation probability.

FIG. 10 is a diagram illustrating a calculation example of the generation probability. For example, the preliminary learning unit 140 sets the cluster ID indicating the state of the system 30 in each time zone in one day in a cluster ID management table 61. In the cluster ID management table 61, in association with the times at which time zones obtained by dividing one day into K time zones end, the cluster IDs indicating the state of the system 30 in the relevant time zone in each day are set. The preliminary learning unit 140 extracts the cluster IDs set at the time T$_1$ in the respective days in the observation period and counts the appearance frequency (the number of times of appearance) of each cluster ID. Thereby, the frequency distribution of the cluster ID at the time T$_1$ is obtained.

When the frequency of each cluster ID is divided by the total number of cluster IDs set at the time T$_1$, the generation probability of each cluster ID is obtained. For example, if the observation period is 30 days, the generation probability is obtained by dividing the frequency of each cluster ID by 30. As a result, the probability distribution of the cluster ID at the time T$_1$ is obtained. The preliminary learning unit 140 also calculates the probability distributions at the other times T$_2$, . . . , T$_K$ similarly.

Figure 11:
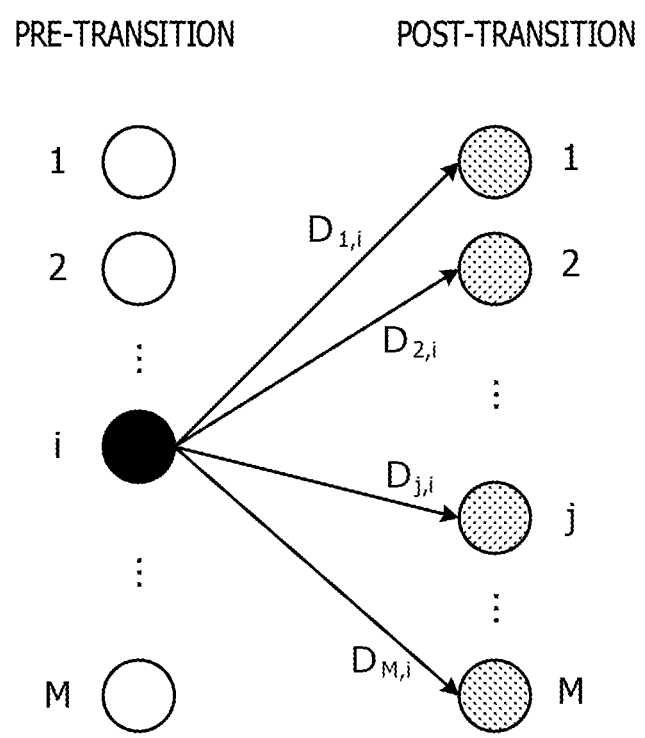
FIG. 11 is a diagram illustrating a calculation example of transition probability.

FIG. 11 is a diagram illustrating a calculation example of the transition probability. For example, the preliminary learning unit 140 identifies the dates and times at which the cluster ID is "i" (what times on what days) from the cluster ID management table 61. The preliminary learning unit 140 extracts all of the cluster IDs at the times subsequent to the relevant dates and times. The preliminary learning unit 140 calculates the generation probability regarding each of the extracted cluster IDs. If the total number of clusters is M (M is an integer equal to or larger than 1), the transition probabilities "D$_{1,i}$, D$_{2,i}$, . . . , D$_{j,i}$, . . . , D$_{M,i}$" from the cluster of the cluster ID "i" to a respective one of all cluster IDs "1, 2, . . . , j, . . . , M" are calculated.

Such transition probabilities are calculated regarding the cases in each of which a respective one of all cluster IDs is employed as the pre-transition cluster ID. As a result, the transition probabilities are calculated regarding all combinations of the pre-transition and post-transition cluster IDs. Then, the transition probability matrix is generated by employing the calculated transition probabilities as elements of the matrix.

The learning result 151 is generated by the above-described preliminary learning.

FIG. 12 is a diagram illustrating one example of the learning result. In the learning result 151, generation probability information 151a, a transition probability matrix 151b, and cluster information 151c are included for example. In the generation probability information 151a, regarding each time, the generation probability of each cluster ID at the relevant time is set.

In the transition probability matrix 151b, the cluster IDs of clusters of the transition source are associated with the columns and the cluster IDs of clusters of the transition destination are associated with the rows. As the element at the position of the intersection of a column and a row in the transition probability matrix 151b, the transition probability in the case in which the cluster ID of this column is the transition source and the cluster ID of this row is the transition destination is set.

In the cluster information 151c, in association with the cluster ID, the sets of the SDRs belonging to the cluster indicated by the cluster ID are set. For each SDR, the date and time when the system 30 becomes the state indicated by the SDR may be set.

On the basis of such a learning result, statistical properties are determined. The statistical properties are whether or not the stationarity of the generation probability and the transition probability exists. The stationarity means that the probability distribution does not change even when the period differs.

Figure 13:
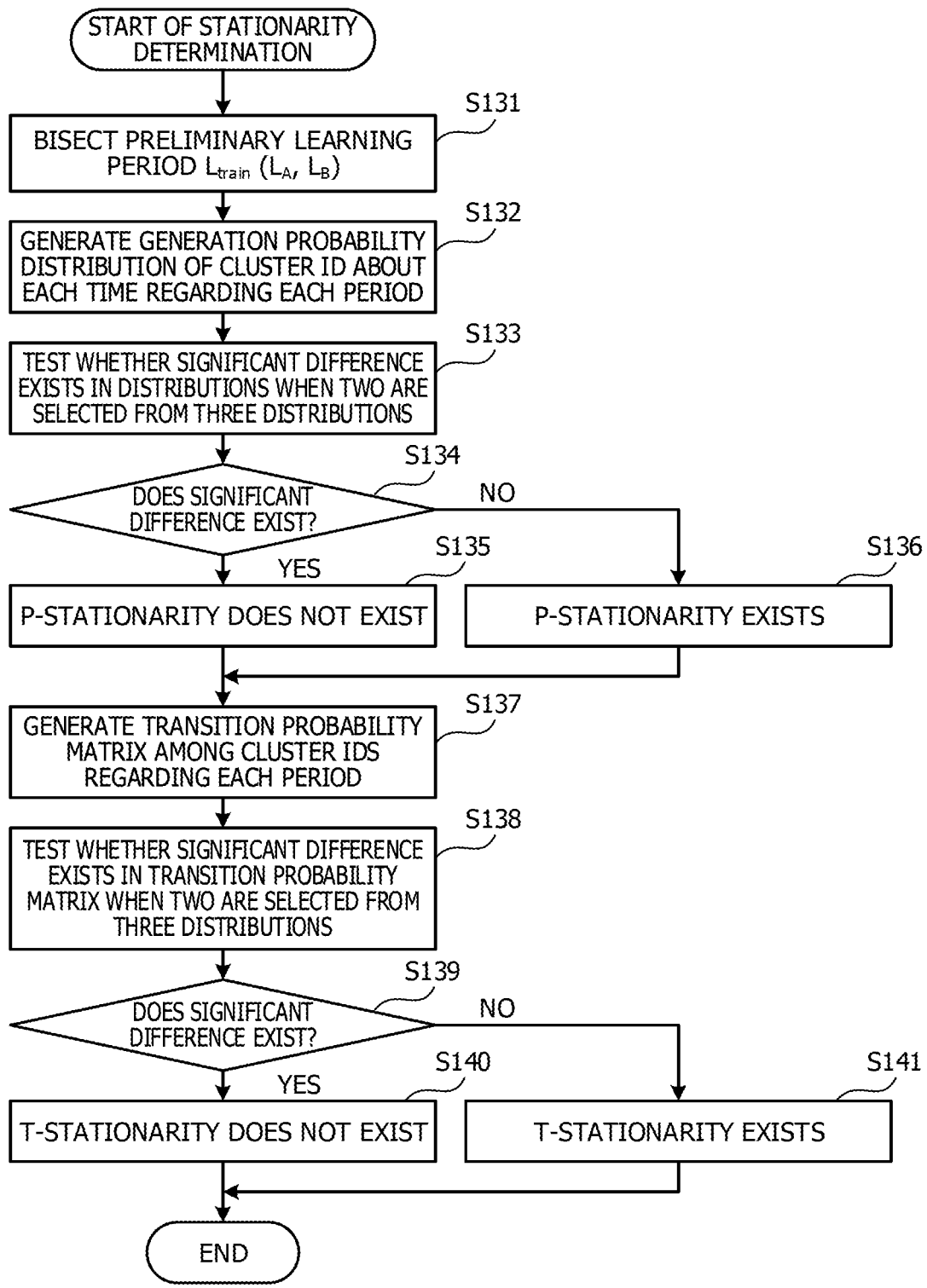
FIG. 13 is a flowchart illustrating a procedure of stationarity determination processing.

FIG. 13 is a flowchart illustrating a procedure of stationarity determination processing. The processing illustrated in FIG. 13 will be described below along the step numbers.

[Step S131] The stationarity determining unit 170 bisects a preliminary learning period $L_{train}$. The stationarity determining unit 170 deems the divided periods obtained by the bisection as $L_A$ and $L_B$.

[Step S132] On the basis of the generation probability information 151a, the stationarity determining unit 170 generates the generation probability distribution of the cluster ID regarding each of the preliminary learning period $L_{train}$ and the divided periods $L_A$ and $L_B$.

[Step S133] The stationarity determining unit 170 generates pairs of two periods from the three periods (three pairs) and tests whether or not a significant difference exists between the generation probability distributions of the two periods in the pair. As the test method, the goodness of fit test ($\chi$-square test), the Kolmogorov-Smirnov test, or the like can be used. In the case of using the goodness of fit test, a statistic "$\chi$-square" is calculated, with one of the compared two generation probability distributions employed as the expected value and the other employed as the observed value. If the value of the $\chi$-square is equal to or larger than a given value, it can be determined that a significant difference exists.

[Step S134] The stationarity determining unit 170 determines whether or not a significant difference exists among the three periods. For example, the stationarity determining unit 170 determines that a significant difference exists if a significant difference is recognized in the generation probability distributions in at least one pair among the three pairs of periods. If a significant difference exists, the processing is advanced to a step S135. If a significant difference does not exist, the processing is advanced to a step S136.

[Step S135] The stationarity determining unit 170 determines that the stationarity of the generation probability distribution (P-stationarity) does not exist, and moves the processing to a step S137.

[Step S136] The stationarity determining unit 170 determines that the P-stationarity exists.

[Step S137] The stationarity determining unit 170 generates a transition probability matrix among the cluster IDs regarding each of the three periods.

[Step S138] The stationarity determining unit 170 generates pairs of two periods from the three periods (three pairs) and tests whether or not a significant difference exists between the transition probability matrices of the two periods in the pair.

[Step S139] The stationarity determining unit 170 determines whether or not a significant difference exists among the three periods. For example, the stationarity determining unit 170 determines that a significant difference exists if a significant difference is recognized in the transition probability matrices in at least one pair among the three pairs of periods. If a significant difference exists, the processing is advanced to a step S140. If a significant difference does not exist, the processing is advanced to a step S141.

[Step S140] The stationarity determining unit 170 determines that the stationarity of the transition probability matrix (T-stationarity) does not exist, and ends the processing.

[Step S141] The stationarity determining unit 170 determines that the T-stationarity exists, and ends the processing.

The determination of the stationarity allows understanding of the presence or absence of the P-stationarity and the T-stationarity. Due to the presence or absence of the P-stationarity and the T-stationarity, the statistical reliability of the learning result can be determined. For example, the statistical reliability of the generation probability information 151a is high if the P-stationarity exists. In this case, a deviation from the stationarity about the generation probability of the cluster to which SDRs indicating the subsequent state of the system 30 belong can be detected by using the generation probability information 151a. Furthermore, the statistical reliability of the transition probability matrix 151b is high if the T-stationarity exists. In this case, a deviation from the stationarity about the transition probability of the cluster to which SDRs indicating the subsequent state of the system 30 belong can be detected by using the transition probability matrix 151b.

The deviation from the stationarity after learning can be detected by causing the observing device 100 to operate in the operation diagnostic mode. The processing of the observing device 100 in the operation diagnostic mode will be described in detail below.

Figure 14:
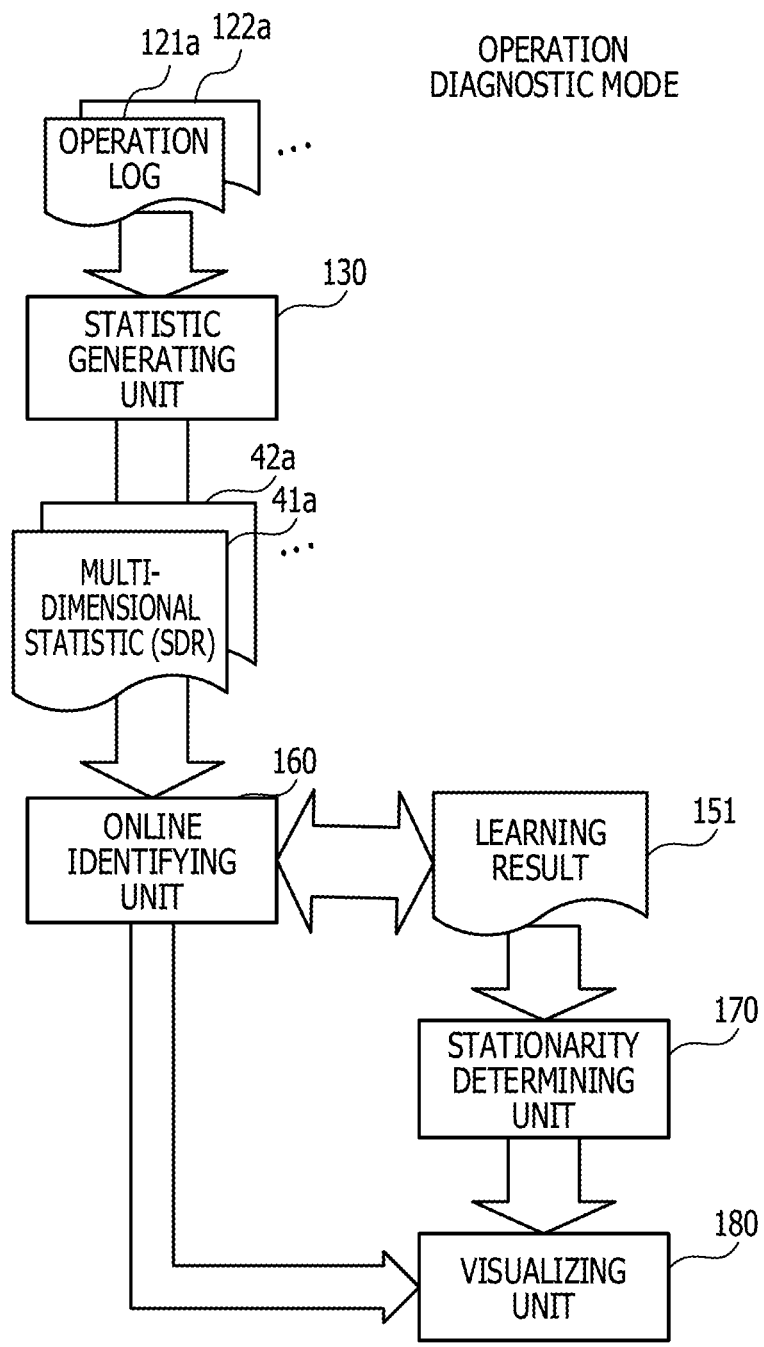
FIG. 14 is a diagram illustrating operating status analysis processing in an operation diagnostic mode.

FIG. 14 is a diagram illustrating operating status analysis processing in the operation diagnostic mode. In the operation diagnostic mode, operation logs 121a, 122a, . . . are collected from the system 30 by the real-time system. Furthermore, SDRs 41a, 42a, . . . are generated by the statistic generating unit 130 every time the operation logs 121a, 122a, . . . are acquired.

The online identifying unit 160 executes online identification processing on the basis of the learning result 151 obtained by preliminary learning. In the online identification processing, dynamic similarity clustering is carried out for new SDRs under operation monitoring. In the dynamic similarity clustering, the cluster to which an SDR belongs is determined every time the SDR is generated. In an online learning mode, the learning result 151 is updated on the basis of the result of the determined clustering.

Thereafter, similarly to the preliminary learning mode, stationarity determination by the stationarity determining unit 170 and visualization processing by the visualizing unit 180 are carried out.

Next, the online identification processing will be described in detail.

Figure 15:
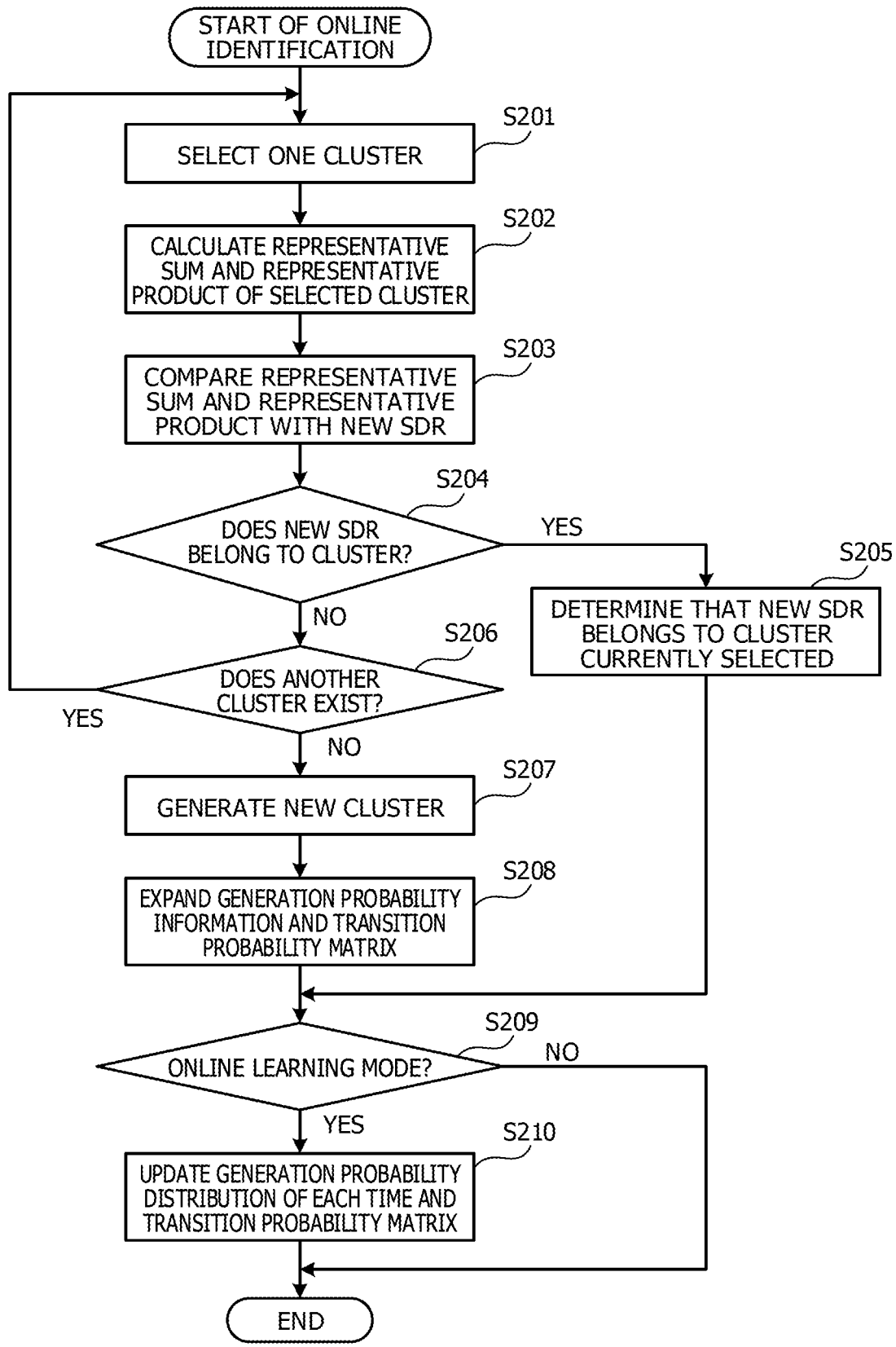
FIG. 15 is a flowchart illustrating one example of online identification processing.

FIG. 15 is a flowchart illustrating one example of the online identification processing. The processing illustrated in FIG. 15 will be described below along the step numbers.

[Step S201] The online identifying unit 160 selects one cluster.

[Step S202] The online identifying unit 160 calculates the representative sum and the representative product of the selected cluster. The calculated representative sum and representative product are managed in association with the selected cluster. Furthermore, the representative sum and the representative product in the first online identification processing in the operation diagnostic mode are calculated on the basis of the result of preliminary learning. Thereafter, the representative sum and the representative product are updated every time the SDRs belonging to the cluster change.

For example, suppose that the following clusters are obtained by preliminary learning.

$$C_{train} = \{C_1, C_2, \ldots, C_n\} \quad (6)$$

A representative sum $S_{i:+}$ and a representative product $S_{i:X}$ about each cluster $\forall C_i$ are defined as follows.

$$\forall C_i \in C_{train}, \forall S_k \in C_i, S_{i:+} = \cup_k S_k, S_{i:X} = \cap_k S_k \quad (7)$$

The representative sum is the logical sum of the bit value of each element of the SDRs in the cluster. That is, the representative sum is a vector in which "1" is set for the element that is "1" in any one SDR and "0" is set for the element that is "0" in all SDRs. The representative product is the logical product of the bit value of each element of the SDRs in the cluster. That is, the representative product is a vector in which "1" is set for the element that is "1" in all SDRs in the cluster and "0" is set for the element that is "0" in any one SDR.

[Step S203] The online identifying unit 160 compares each of the representative sum and the representative product with an SDR newly generated. For example, the online identifying unit 160 deems the newly-input SDR as $S_X$. At this time, the online identifying unit 160 carries out, for $S_X$, determination of whether $S_X$ belongs to any of $C_1$, $C_2, \ldots, C_n$ at high speed due to the following calculation by using the representative sum and the representative product.

$$S_X \in C_i \Leftrightarrow \exists C_i \in C_{train}, (S_X \subset S_{i:+}) \& (S_X \supset S_{i:X}) \quad (8)$$

In expression (8), "$S_X \subset S_{i:+}$" indicates that the element that is "1" in the vector of the new SDR is "1" also in the representative sum of the cluster $C_i$. "$S_X \supset S_{i:X}$" indicates that the element that is "1" in the representative product of the cluster $C_i$ is "1" also in the vector of the new SDR. If the new SDR satisfies both "$S_X \subset S_{i:+}$" and "$S_X \supset S_{i:X}$" it can be determined that the SDR belongs to the cluster Q. Due to such a calculation, which cluster the new SDR belongs to can be determined by merely carrying out the comparison of the bit vector twice.

Even when the new SDR ($S_X$) does not satisfy the relationship of expression (8) with the cluster $C_i$, possibly the similarity $J(s_i, s_j) \geq th$ is satisfied between SDR ($S_X$) and all SDRs belonging to the cluster $C_i$ depending on the case. Therefore, if the cluster to which the new SDR belongs is not found in the determination based on expression (8), the online identifying unit 160 determines the cluster to which the new SDR belongs by the following expression for example.

$$J((S_{i:+} \cup S_X), (S_{i:X} \cap S_X)) \geq th \quad (9)$$

If the cluster $C_i$ satisfying expression (9) although not satisfying expression (8) exists with respect to the new SDR, it can be determined that the new SDR belongs to the cluster $C_i$.

[Step S204] The online identifying unit 160 determines whether or not the new SDR belongs to the selected cluster. If the new SDR belongs to the selected cluster, the processing is advanced to a step S205. If the new SDR does not belong to the selected cluster, the processing is advanced to a step S206.

[Step S205] The online identifying unit 160 determines that the new SDR belongs to the cluster currently selected, and gives the cluster ID of the cluster currently selected to the SDR. Thereafter, the processing is advanced to a step S209.

[Step S206] The online identifying unit 160 determines whether or not a cluster that has not been selected exists. If a cluster that has not been selected exists, the processing is advanced to the step S201. If all clusters have been selected, the processing is advanced to a step S207.

[Step S207] If the new SDR belongs to none of the existing clusters, the online identifying unit 160 generates the new cluster represented below.

$$C_{n+1} = \{S_X\} \quad (10)$$

[Step S208] The online identifying unit 160 expands the generation probability information and the transition probability matrix on the basis of the newly-generated cluster. For example, the online identifying unit 160 increases the field of the cluster ID by one for the generation probability information 151*a* (see FIG. 12). Furthermore, the online identifying unit 160 adds one column of the transition source cluster ID and adds one row of the transition destination cluster ID for the transition probability matrix 151*b* (see FIG. 12).

[Step S209] The online identifying unit 160 determines whether or not the current mode is the online learning mode. If the current mode is the online learning mode, the processing is advanced to a step S210. If the current mode is not the online learning mode, the processing ends.

[Step S210] The online identifying unit 160 updates the generation probability distribution of each time in the generation probability information 151*a* and the values of elements in the transition probability matrix 151*b*. Thereafter, the processing ends.

Due to such online identification, every time an SDR is generated, clustering including the SDR can be carried out. If the clustering result is immediately visualized, the state of the system 30 can be observed in real time.

Figure 16:
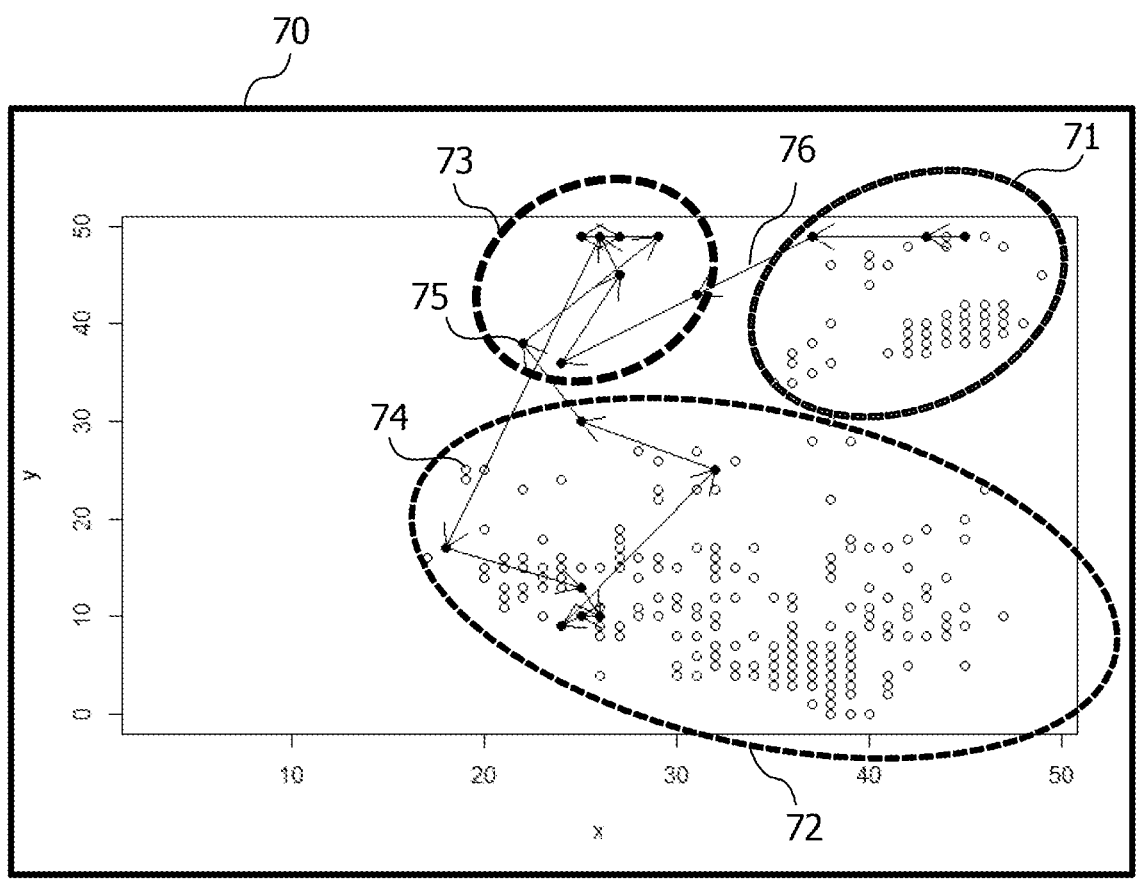
FIG. 16 is a diagram illustrating an example of visualization.

FIG. 16 is a diagram illustrating an example of visualization. In FIG. 16, a visualization screen 70 in which SDRs are represented by dots is illustrated. In the visualization screen 70, two-dimensional distribution of SDRs in the morning on weekdays in a certain month (excluding weekends and holidays) is displayed. In the example of FIG. 16, high-dimensional data is displayed with dimension reduction.

One SDR is calculated every ten minutes. Each SDR is displayed by a white circle 74 in the visualization screen 70.

Note that it has proven that a system abnormality occurred in the morning on the last business day of this month.

Furthermore, SDRs on the day when the system abnormality occurs are displayed by black circles 75 in the visualization screen 70. In addition, the transition of the SDR over time is displayed by arrows 76 in the visualization screen 70.

In the morning, immediately after the system starts to operate, almost all SDRs belong to a cluster 71. It has proved that, thereafter, the operation load increases over time and the SDR moves to an area of a cluster 72. To avoid the complexity of the diagram, arrows indicating the transition from the cluster 71 to the cluster 72 are omitted. The cluster 72 represents the normal state in the usual morning.

Here, attention will be paid to the way of the appearance of the SDR and the time change on the last business day, when the abnormality occurs in the system. First, the SDR belongs to the cluster 71. However, with that the system begins to become the abnormal state being a trigger, the SDR gradually deviates from the state of belonging to the cluster 71 and makes transition to the state of belonging to a new cluster 73. Thereafter, the system temporarily becomes the normal operating status and the SDR makes transition to the cluster 72. However, immediately the system becomes the abnormal state again and the SDR returns to the cluster 73.

In FIG. 16, the state in the morning on weekdays is displayed. However, it is also possible to display the states in various time zones, such as the state in the afternoon on weekdays, the state on one weekday, and the state on holidays, on the visualization screen 70. Furthermore, the dots representing the SDRs can be displayed with colors different for each time zone in one day for example. The color of the dot representing the SDR may be differentiated due to whether the relevant day is a weekday or a holiday.

By carrying out the SDR clustering in this manner and, regarding each time zone, visualizing and displaying clusters whose appearance frequency of the SDR is high in the time zone, the administrator can easily recognize the normal operating status of the system 30. If the normal state can be grasped, detection of the abnormal state also becomes easy.

For example, when an SDR indicating the state of the system 30 is generated on a holiday in the operation diagnostic mode, there is a possibility that the system 30 is in any abnormal state if the SDR belongs to the cluster 72. For example, the visualizing unit 180 can display the current state of the system 30 in such a manner that the administrator can easily understand the state by highlighting the SDR generated last on the visualization screen 70. Furthermore, when the position of the highlighted SDR greatly deviates from normal positions of the SDR in the current time zone, the administrator can recognize that there is a possibility that an abnormality occurred.

Incidentally, in the second embodiment, the similarity between SDRs is calculated by using the Jaccard index and clustering is carried out by using the similarity. Due to such a clustering method, there are various advantages over other clustering methods.

For example, as a clustering method, there is a method of automatically dividing a given set of data into subsets on the basis of the distance measure and the similarity. In a rough classification, methods of clustering are classified into the following methods. 1) Hierarchical clustering: a clustering result is displayed by a tree diagram by using a distance matrix (Cophenetic matrix). 2) Non-hierarchical clustering (k-means method and so forth): the number of clusters is specified and clusters are so classified that the distance measure and the similarity become the minimum. 3) Clustering based on a model (mixture distribution method and so forth): clustering is based on a model of probability distribution.

In 1) and 2), the initial value dependence (result depends on the element selected first) is strong. The k-means method exists as a representative method of 2) non-hierarchical clustering, which is used most frequently. In the k-means method, a cluster is randomly allocated to each piece of data and the center $V_j$ of each cluster is calculated on the basis of the data to which the cluster is allocated. Then, distance from the center of each cluster is obtained regarding each piece of data and the data is reallocated to the nearest cluster. As the distance between data $x_i$ and the center of the cluster, e.g. the distance measure is represented by the following expression.

$$\|x_i - V_j\|^2 \tag{11}$$

Besides, it is also possible to calculate the distance by using the Euclidean distance (normal distance in a three-dimensional space is extended to a higher dimension) or the like. Such a clustering method involves the following problems. A) To obtain the optimum cluster segmentation, the number of generated clusters is variously changed and the result is considered. B) Although the algorithm is fixed, the result changes depending on from which element the processing is started (clustering has the initial value dependence). C) Although fixed distance measure or similarity is employed on each clustering method basis, an element with low similarity is also occasionally found even in the same cluster when the similarity is measured by the Jaccard index regarding a vector like $v=(1/0, 1/0, \ldots, 1/0)$. D) Addition of an element to the original set is not assumed (static method). That is, a new element is added and clustering is carried out again. At this time, the clustering result before the addition of the new element is not ensured.

In contrast, the second embodiment has the following advantages. A) An independent variable for the algorithm is the similarity threshold and the number of segmented clusters is a dependent variable. That is, the optimum number of clusters is decided later. B) Static similarity clustering does not have the initial value dependence (because clustering is started from the element having the most companions surpassing the similarity threshold). C) Elements whose similarity is high are clustered because the similarity threshold is given. D) A new element is classified on the result of static similarity clustering by dynamic similarity clustering and, if an appropriate cluster does not exist, a new cluster is generated and the new element is positioned in this cluster. Therefore, clustering can be dynamically carried out without breaking up the existing clusters.

As above, in the second embodiment, instead of giving the number of clusters, a criterion (similarity threshold) is given regarding the similarity on the basis of the Jaccard index and clusters are generated. Therefore, a restriction relating to the number of generated clusters does not exist. On the other hand, it is ensured that SDRs belonging to the same cluster have a similarity equal to or higher than the threshold.

In addition, methods different between the static similarity clustering and the dynamic similarity clustering are employed and SDRs can be added by the dynamic similarity clustering to the clustering result by the static similarity clustering. This can carry out determination of whether or not the state of the system 30 is abnormal in real time.

Various methods can be applied as the calculation method of the similarity between SDRs in the second embodiment. As the similarity calculation methods that can be applied, "similarity calculation of one-dimensional bit rows," "similarity calculation of vectors," and "calculation of distance derived from a norm in a n-dimensional vector space" are conceivable in a rough classification. In the following description, the number of elements included in a set A is represented as |A|.

<Similarity Calculation of One-dimensional Bit Rows>
<<1. Jaccard Index (Employed in the Second Embodiment)>>

The Jaccard index is a value obtained by dividing the number of elements common to sets X and Y ($|X \cap Y|$) by the total number of elements existing in at least one of the sets X and Y ($|X \cup Y|$). When being represented with the sets, the Jaccard index is represented by the following expression.

$$sim=|X \cap Y|/|X \cup Y| \qquad (12)$$

It is also possible to obtain the Jaccard index by calculation of vectors. For example, the elements of $X \cup Y$ are deemed as $z_1, z_2, \ldots, z_n$ and a vector $x=(x_1, x_2, \ldots, x_n)$ is defined as $x_i=1$ (if $z_i \in X$), $x_i=0$ (otherwise). When a vector y is also defined similarly, the Jaccard index can be represented as follows.

$$sim=x \cdot y/(\Sigma x_i + \Sigma y_i - x \cdot y) \qquad (13)$$

Here, $x \cdot y$ is the inner product of the vector x and the vector y.

<<2. Dice's Coefficient>>

The Dice's coefficient is a value obtained by dividing the number of elements common to sets X and Y by the average of the numbers of elements of the respective sets. When being represented with the sets, the Dice's coefficient is represented by the following expression.

$$sim=(2 \times |X \cap Y|)/(|X|+|Y|) \qquad (14)$$

In the case of obtaining the Dice's coefficient by calculation of vectors, the Dice's coefficient is obtained by the following expression.

$$sim=(2 \times x \cdot y)/(\Sigma x_i + \Sigma y_i) \qquad (15)$$

<<3. Simpson's Coefficient>>

The Simpson's coefficient is a value obtained by dividing the number of elements common to sets X and Y by the minimum value of the numbers of elements of the respective sets. When being represented with the sets, the Simpson's coefficient is represented by the following expression.

$$sim=|X \cap Y|/\min(|X|,|Y|) \qquad (16)$$

$\min(|X|, |Y|)$ denotes the smaller value in the values in the parentheses. In the case of obtaining the Simpson's coefficient by calculation of vectors, the Simpson's coefficient is obtained by the following expression.

$$sim=x \cdot y/\min(\Sigma x_i, \Sigma y_i) \qquad (17)$$

<Similarity of Vectors>
<<Cosine Similarity>>

The cosine similarity is the cosine $\cos \theta$ of an angle $\theta$ formed by vectors x and y. The cosine similarity is defined by deeming the approximation of the directions of the vectors as an index of the similarity. The cosine similarity is represented by the following expression.

$$sim=x \cdot y/(|x| \times |y|) \qquad (18)$$

$|x|$ and $|y|$ are the length (norm) of the vectors x and y.
<<Pearson's Correlation Coefficient>>

The Pearson's correlation coefficient is the correlation between two probability variables. The Pearson's correlation coefficient can also be used as a measure of the similarity. x and y are deemed as two variables and the Pearson's correlation coefficient is calculated as a correlation coefficient of pairs of values $(x_i, y_i)$ ($i=1, 2, \ldots, n$) of each dimension. If the Pearson's correlation coefficient is "1," this indicates that the values completely correspond with each other. If the Pearson's correlation coefficient is "0," this indicates that the values have no correlation. If the Pearson's correlation coefficient is "−1," this indicates that the values completely discord with each other.

For example, the average of the dimensional elements $x_i$ ($i=1, 2, \ldots, n$) of the vector x is deemed as $m_x$ and a vector $v=x-m_x=(x_1-m_x, x_2-m_x, x_n-m_x)$ is defined. Similarly, regarding the vector y, a vector $w=y-m_y=(y_1-m_y, y_2-m_y, \ldots, y_n-m_y)$ is defined. At this time, the Pearson's correlation coefficient is represented by sim=cosine similarity between v and $w=v \cdot w/(|v| \times |w|)$.

<<Deviation Pattern Similarity>>

For the Pearson's correlation coefficient, the deviation vector from the average of the values of the dimensional elements of the respective vectors is considered. For the deviation pattern similarity, the deviation vector from the average vector of all vectors is used.

The average of the i-th dimensional elements $x_i$ is defined as $m_i$ and the average vector is defined as $m=(m_1, m_2, \ldots, m_n)$.

The deviation vectors of x and y are defined as $v=x-m=(x_1-m_1, x_2-m_2, \ldots, x_n-m_n)$ and $w=y-m=(y_1-m_1, y_2-m_2, y_n-m_n)$. At this time, the deviation pattern similarity is represented by sim=cosine similarity between v and $w=v \cdot w/(|v| \times |w|)$.

<Distance Derived from Norm in n-dimensional Vector Space>

This represents the similarity on the basis of the approximation of the distance. The SDR is deemed as $x=(x_1, x_2, \ldots, x_N)$ (N-dimensional vector space). At this time, the "norm" as an expansion of the concept of "length" is defined as follows.

The "norm" satisfies the following definition.

$$1. \; \|v\|=0 \Leftrightarrow v=0 \qquad (19)$$

$$2. \; \|av\|=|a|\|v\| \qquad (20)$$

$$3. \; \|u+v\| \leq \|u\|+\|v\| \qquad (21)$$

When the norm can be defined, distance d $(x, y)=\|x-y\|$ between two points can be defined. It can be proved that these points satisfy the distance axiom from the definition of the norm. That is, when the definition of the norm is different, different distance (=similarity) can be defined.

As an example of the norm, there is the following norm.
p-norm (referred to also as Minkowski norm)

$$L_p=(|x1-y1|^p+|x2-y2|^p+ \ldots +|xN-yN|^p)^{(1/p)} \qquad (22)$$

(p is a positive constant)
For p=1, the distance generated from this norm is referred to as the Manhattan distance.
For p=2, the distance generated from this norm is referred to as the Euclidean distance.
For p=∞, this norm corresponds with the maximum norm and is referred to as the Chebyshev distance. The maximum norm is represented by the following expression.

$$L_{max}=\max(|x_1|,|x_2|, \ldots ,|x_N|) \qquad (23)$$

max is a function of returning the maximum value of the argument.

Although the embodiments are exemplified above, the configurations of the respective units represented in the embodiments can be replaced by other elements having similar functions. Furthermore, other arbitrary constituents or steps may be added. Moreover, an element obtained by combining arbitrary two or more configurations (characteristics) in the above-described embodiments may be employed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable medium storing a computer-executable program causing a computer to execute a process comprising:
   generating a plurality of pairs of items from among a plurality of items relating to a performance or a load in a computer system;
   calculating, for each of the plurality of pairs, a correlation coefficient between items of the respective pairs based on information indicating a time series data of values corresponding to the respective pairs in each of unit periods;
   generating, for each of the unit periods, correlation information indicating a correlation matrix data including a plurality of items as rows and columns by setting a first value of an element corresponding to the respective pairs when the correlation coefficient of the respective pairs is equal to or larger than a threshold value and setting a second value to an element corresponding to the respective pairs when the correlation coefficient of the respective pairs is smaller than the threshold value;
   calculating a similarity between a plurality of pieces of correlation information which each is generated for the respective unit periods;
   clustering the plurality of pieces of correlation information into one or more clusters each representing a state of the computer system, based on the calculated similarities; and
   displaying, when one of the one or more clusters has one of the plurality of pieces of correlation information and does not have another correlation information, information related to one or more unit periods corresponding to one of the one or more clusters as a cluster including an indication of an anomaly in the state of the computer system,
   wherein a value of 1 is set as the first value when a correlation coefficient of the respective pairs is equal or larger than the threshold, and a value of 0 is set as the second value when the correlation coefficient of the respective pairs is smaller than the threshold.

2. The non-transitory computer readable medium according to claim 1, wherein the process further comprises:
acquiring the time series data from the computer system to be monitored.

3. The non-transitory computer readable medium according to claim 1, wherein the calculating of the similarity includes calculating a similarity between one correlation matrix data for one of the unit periods and another correlation matrix data for another of the unit periods, based on a ratio between a number elements for which a logical sum of the elements in the one correlation matrix and the another correlation matrix is 1 and a number of elements for which a logical product of the elements in the one correlation matrix and the another correlation matrix is 1.

4. The non-transitory computer readable medium according to claim 1, wherein the process further comprises:
   selecting one of a first mode for performing a preliminary learning, and a second mode for performing an online learning.

5. The non-transitory computer readable medium according to claim 4, wherein when the first mode is selected, the one or more clusters are stored as learned information.

6. The non-transitory computer readable medium according to claim 5, wherein when the second mode is selected, the learned information is updated based on generation of a new piece of correlation information.

7. The non-transitory computer readable medium according to claim 6, wherein a new cluster is generated when the new piece of correlation information is not clustered with any one of the one or more clusters stored as the learned information.

8. The non-transitory computer readable medium according to claim 1, wherein the process further comprises:
   for each cluster generated, calculating at least one representative value of the at least one piece of correlation information in the cluster; and
   when a new piece of correlation information is generated, detecting a cluster whose at least one representative value does not change upon addition of the new piece of correlation information into the cluster, and clustering the new piece of correlation information with the detected cluster.

9. A detection method for detecting an abnormal state in a computer system, the detection method comprising:
   generating a plurality of pairs of items from among a plurality of items relating to a performance or a load in the computer system;
   calculating, for each of the plurality of pairs, a correlation coefficient between items of the respective pairs based on information indicating a time series data of values corresponding to the respective pairs in each of the unit periods;
   generating, for each of the unit periods, correlation information indicating a correlation matrix data including a plurality of items as rows and columns by setting a first value to an element corresponding to the respective pairs when the correlation coefficient of the respective pairs is equal to or larger than a threshold value and setting a second value to an element corresponding to the respective pairs when the correlation coefficient of the respective pairs is smaller than the threshold value;
   calculating a similarity between a plurality of pieces of correlation information which each is generated for the respective unit periods;
   clustering the plurality of pieces of correlation information into one or more clusters each representing a state of the computer system, based on the calculated similarities; and
   displaying, when one of the one or more clusters has one of the plurality of pieces of correlation information and does not have another correlation information, information related to one or more unit periods corresponding to one of the one or more clusters as a cluster including an indication of an anomaly in the state of the computer system,
   wherein a value of 1 is set as the first value when a correlation coefficient of the respective pairs is equal or larger than the threshold, and a value of 0 is set as the second value when the correlation coefficient of the respective pairs is smaller than the threshold.

10. The detection method according to claim 9, wherein the process further comprises: acquiring the time series data from the computer system to be monitored.

11. The detection method according to claim 9, wherein the calculating of the similarity includes calculating a similarity between one correlation matrix data for one of the unit periods and another correlation matrix data for another of the unit periods, based on a ratio between a number elements for which a logical sum of the elements in the one correlation matrix and the another correlation matrix is 1 and a number of elements for which a logical product of the elements in the one correlation matrix and the another correlation matrix is 1.

12. The detection method according to claim 9, further comprising:
selecting one of a first mode for performing a preliminary learning, and a second mode for performing an online learning.

13. The detection method according to claim 12, wherein when the first mode is selected, the one or more clusters are stored as learned information.

14. The detection method according to claim 13, wherein when the second mode is selected, updating the learned information based on generation of a new piece of correlation information.

15. The detection method according to claim 14, wherein a new cluster is generated when the new piece of correlation information is not clustered with any one of the one or more clusters stored as the learned information.

16. The detection method according to claim 15, further comprising:
for each cluster generated, calculating at least one representative value of the at least one piece of correlation information in the cluster; and
when a new piece of correlation information is generated, detecting a cluster whose at least one representative value does not change upon addition of the new piece of correlation information into the cluster, and clustering the new piece of correlation information with the detected cluster.

17. An information processing device comprising:
a memory; and
a processor coupled to the memory and configured to:
generate a plurality of pairs of items from among a plurality of items relating to a performance or a load in a computer system,
calculate, for each of the plurality of pairs, a correlation coefficient between items of the respective pairs based on information indicating a time series data of values corresponding to the respective pairs in each of unit periods,
generate, for each of the unit periods, correlation information indicating a correlation matrix data including a plurality of items as rows and columns by setting a first value to an element corresponding to the respective pairs when the correlation coefficient of the respective pairs is equal to or larger than a threshold value and setting a second value to an element corresponding to the respective pairs when the correlation coefficient of the respective pairs is smaller than the threshold value,
calculate a similarity between a plurality of pieces of correlation information which each is generated for the respective unit periods, and
cluster the plurality of pieces of correlation information into one or more clusters each representing a state of the computer system, based on the calculated similarities;
a display configured to display, when one of the one or more clusters has one of the plurality of pieces of correlation information and does not have another correlation information, information related to one or more unit periods corresponding to one of the one or more clusters as a cluster including an indication of an anomaly in the state of the computer system,
wherein a value of 1 is set as the first value when a correlation coefficient, of the respective pairs is equal or larger than the threshold, and a value of 0 is set as the second value when the correlation coefficient of the respective pairs is smaller than the threshold.

* * * * *